US009214282B1

(12) United States Patent
Ikeda et al.

(10) Patent No.: US 9,214,282 B1
(45) Date of Patent: Dec. 15, 2015

(54) THREE-TERMINAL CAPACITOR

(71) Applicant: Murata Manufacturing Co., Ltd., Nagaokakyo-shi, Kyoto-fu (JP)

(72) Inventors: Mitsuru Ikeda, Nagaokakyo (JP); Hirobumi Adachi, Nagaokakyo (JP); Hitoaki Kimura, Nagaokakyo (JP); Takashi Sawada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/563,092

(22) Filed: Dec. 8, 2014

(51) Int. Cl.
*H01G 4/30* (2006.01)
*H01G 4/228* (2006.01)
*H01G 4/005* (2006.01)
*H01G 4/12* (2006.01)
*H01G 4/012* (2006.01)

(52) U.S. Cl.
CPC .............. *H01G 4/228* (2013.01); *H01G 4/012* (2013.01); *H01G 4/1227* (2013.01); *H01G 4/30* (2013.01)

(58) Field of Classification Search
CPC ...................................... H01G 9/04
USPC ................... 361/301.4, 303, 306.3
See application file for complete search history.

(56) References Cited

U.S. PATENT DOCUMENTS

| | | | | |
|---|---|---|---|---|
| 4,590,537 A | * | 5/1986 | Sakamoto | 361/306.3 |
| 5,880,925 A | * | 3/1999 | DuPre et al. | 361/303 |
| 6,038,121 A | * | 3/2000 | Naito et al. | 361/303 |
| 8,630,083 B2 | * | 1/2014 | Ahn et al. | 361/306.3 |
| 2001/0055191 A1 | | 12/2001 | Naito et al. | |
| 2004/0207872 A1 | * | 10/2004 | Takahashi et al. | 358/1.15 |
| 2008/0186652 A1 | | 8/2008 | Lee et al. | |
| 2009/0073634 A1 | * | 3/2009 | Lee et al. | 361/303 |
| 2010/0149769 A1 | | 6/2010 | Lee et al. | |
| 2013/0050893 A1 | | 2/2013 | Kim | |
| 2013/0050897 A1 | | 2/2013 | Kim | |
| 2013/0050899 A1 | | 2/2013 | Kim et al. | |
| 2013/0058006 A1 | | 3/2013 | Kim | |
| 2014/0160618 A1 | | 6/2014 | Yoon et al. | |

FOREIGN PATENT DOCUMENTS

| | | |
|---|---|---|
| JP | 11-144996 A | 5/1999 |
| KR | 10-2014-0038871 A | 3/2014 |
| KR | 10-2014-0038872 A | 3/2014 |
| KR | 10-2014-0038876 A | 3/2014 |

(Continued)

*Primary Examiner* — Eric Thomas
(74) *Attorney, Agent, or Firm* — Keating & Bennett, LLP

(57) ABSTRACT

A length of a first-side outer electrode is E1, a length of a second-side outer electrode is E3, a length of a center outer electrode is E2, a distance between the first-side outer electrode and the center outer electrode is ME1, a distance between the center outer electrode and the second-side outer electrode is ME2, a length of a capacitor element is L, a width from an edge of the first side second extending portion closer to a third surface to the third surface is M1L, a width from an edge of the first side second extending portion closer to a fourth surface to an edge of the first-side outer electrode on a first surface is M1R, a width from an edge of the first extending portion closer to the third surface to an edge of the center outer electrode on the first surface closer to the third surface is M2L, and a width from an edge of the first extending portion closer to the fourth surface to an edge of the center outer electrode on the first surface closer to the fourth surface is M2R, such that E1+ME1+E2+ME2+E3>L, |ME1−ME2|<50 μm, M2L<M2R, and M1R>M1L are satisfied.

1 Claim, 22 Drawing Sheets

(56) References Cited

FOREIGN PATENT DOCUMENTS

| KR | 10-2014-0038911 A | 3/2014 |
|----|-------------------|--------|
| KR | 10-2014-0038912 A | 3/2014 |
| KR | 10-2014-0038914 A | 3/2014 |
| KR | 10-2014-0038915 A | 3/2014 |
| KR | 10-2014-0038916 A | 3/2014 |
| KR | 10-2014-0039016 A | 3/2014 |
| KR | 10-1376925 B1 | 3/2014 |

* cited by examiner

THREE-TERMINAL CAPACITOR

BACKGROUND OF THE INVENTION

1. Field of the Invention

The present invention relates to a three-terminal capacitor.

2. Description of the Related Art

As electronic devices are becoming smaller and increasing their capacitance, there is also an increasing demand for smaller and increased-capacitance multilayer ceramic capacitors used in electronic devices. Additionally, due to the provision of higher-frequency, lower-voltage, and lower-power-consumption electronic devices, multilayer ceramic capacitors having a small equivalent series inductance (ESL) are required. As an example of a multilayer ceramic capacitor having a small ESL, a three-terminal ceramic capacitor is known. In this three-terminal ceramic capacitor, the distance between outer electrodes is decreased so as to decrease the path through which a current flows, thereby reducing the inductance of the three-terminal ceramic capacitor.

An example of such a three-terminal ceramic capacitor is disclosed in Japanese Unexamined Patent Application Publication No. 11-144996.

However, if the distance between outer electrodes is small, the insulation resistance (IR) value between the side outer electrodes is likely to be reduced. Accordingly, a certain distance between outer electrodes is required. However, if the position at which a paste for forming an outer electrode is applied is displaced, the distance between outer electrodes is decreased.

SUMMARY OF THE INVENTION

Accordingly, preferred embodiments of the present invention provide a three-terminal capacitor in which insulation resistance between outer electrodes is less likely to be decreased since a distance between the side outer electrodes is maintained even if the position at which a paste for forming an outer electrode is applied is displaced.

According to a preferred embodiment of the present invention, a three-terminal capacitor includes a capacitor element including first and second surfaces extending in a length direction and in a width direction, third and fourth surfaces extending in the width direction and in a thickness direction, and fifth and sixth surfaces extending in the length direction and in the thickness direction; a first-side outer electrode that is disposed at a first end portion of the first surface in the length direction and on predetermined areas of the third, fifth, and sixth surfaces; a second-side outer electrode that is disposed at a second end portion of the first surface in the length direction and on portions of the fourth, fifth, and sixth surfaces; a center outer electrode that is disposed at a portion of the first surface between the first-side outer electrode and the second-side outer electrode in the length direction and on portions of the fifth and sixth surfaces; a plurality of first conductor layers that are disposed within the capacitor element and that are electrically connected to the center outer electrode via a first extending portion; and a plurality of second conductor layers that are disposed within the capacitor element and that are electrically connected to the first-side outer electrode via a first-side second extending portion and to the second-side outer electrode via a second-side second extending portion; wherein a length of the first-side outer electrode in the length direction is E1; a length of the second-side outer electrode in the length direction is E3; a length of the center outer electrode in the length direction is E2; a width from an edge of the first-side second extending portion closer to the third surface to the third surface is M1L; a width from an edge of the first-side second extending portion closer to the fourth surface to an edge of the first-side outer electrode on the first surface is M1R; a width from an edge of the first extending portion closer to the third surface to an edge of the center outer electrode on the first surface closer to the third surface is M2L; a width from an edge of the first extending portion closer to the fourth surface to an edge of the center outer electrode on the first surface closer to the fourth surface is M2R; a width from an edge of the second-side second extending portion closer to the fourth surface to the fourth surface is M3R; and a width from an edge of the second-side second extending portion closer to the third surface to an edge of the second-side outer electrode on the first surface is M3L; and E1<E2, E3<E2, M2L<M2R, M1L<M1R, and M3L<M3R are satisfied.

According to a preferred embodiment of the present invention, a three-terminal capacitor includes a capacitor element including first and second surfaces extending in a length direction and in a width direction, third and fourth surfaces extending in the width direction and in a thickness direction, and fifth and sixth surfaces extending in the length direction and in the thickness direction; a first-side outer electrode that is disposed at a first end portion of the first surface in the length direction and on predetermined areas of the third, fifth, and sixth surfaces; a second-side outer electrode that is disposed at a second end portion of the first surface in the length direction and on portions of the fourth, fifth, and sixth surfaces; a center outer electrode that is disposed at a portion of the first surface between the first-side outer electrode and the second-side outer electrode in the length direction and on portions of the fifth and sixth surfaces; a plurality of first conductor layers that are disposed within the capacitor element and that are electrically connected to the center outer electrode via a first extending portion; and a plurality of second conductor layers that are disposed within the capacitor element and that are electrically connected to the first-side outer electrode via a first-side second extending portion and to the second-side outer electrode via a second-side second extending portion; wherein a length of the first-side outer electrode in the length direction is E1; a length of the second-side outer electrode in the length direction is E3; a length of the center outer electrode in the length direction is E2; a distance between the first-side outer electrode and the center outer electrode is ME1; a distance between the center outer electrode and the second-side outer electrode is ME2; a length of the capacitor element in the length direction is L; a width from an edge of the first-side second extending portion closer to the third surface to the third surface is M1L; a width from an edge of the first-side second extending portion closer to the fourth surface to an edge of the first-side outer electrode on the first surface is M1R; a width from an edge of the first extending portion closer to the third surface to an edge of the center outer electrode on the first surface closer to the third surface is indicated by M2L; a width from an edge of the first extending portion closer to the fourth surface to an edge of the center outer electrode on the first surface closer to the fourth surface is M2R; and E1+ME1+E2+ME2+E3>L, |ME1−ME2|<50 μm, M2L<M2R, and M1R>M1L are satisfied, or E1+ME1+E2+ME2+E3>L, |ME1−ME2|<50 μm, M2L>M2R, and M1R<M1L are satisfied.

According to the preferred embodiment of the present invention described above, it is preferably that a width from an edge of the second-side second extending portion closer to the third surface to an edge of the second-side outer electrode on the first surface is M3L, and each of M1R/L, M2L/L, M2R/L, and M3L/L is about 1.5% or higher.

According to a preferred embodiment of the present invention, a three-terminal capacitor includes a capacitor element including first and second surfaces extending in a length direction and in a width direction, third and fourth surfaces extending in the width direction and in a thickness direction, and fifth and sixth surfaces extending in the length direction and in the thickness direction; a first-side outer electrode that is disposed at a first end portion of the first surface in the length direction and on predetermined areas of the third, fifth, and sixth surfaces; a second-side outer electrode that is disposed at a second end portion of the first surface in the length direction and on portions of the fourth, fifth, and sixth surfaces; a center outer electrode that is disposed at a portion of the first surface between the first-side outer electrode and the second-side outer electrode in the length direction and on portions of the fifth and sixth surfaces; a plurality of first conductor layers that are disposed within the capacitor element and that are electrically connected to the center outer electrode via a first extending portion; and a plurality of second conductor layers that are disposed within the capacitor element and that are electrically connected to the first-side outer electrode via a first-side second extending portion and to the second-side outer electrode via a second-side second extending portion; wherein a length of the first-side outer electrode in the length direction is E1; a length of the second-side outer electrode in the length direction is E3; a length of the center outer electrode in the length direction is E2; a distance between the first-side outer electrode and the center outer electrode is ME1; a distance between the center outer electrode and the second-side outer electrode is ME2; a length of the capacitor element in the length direction is L; a width from an edge of the first-side second extending portion closer to the third surface to the third surface is M1L; a width from an edge of the first-side second extending portion closer to the fourth surface to an edge of the first-side outer electrode on the first surface is M1R; a width from an edge of the first extending portion closer to the third surface to an edge of the center outer electrode on the first surface closer to the third surface is indicated by M2L; a width from an edge of the first extending portion closer to the fourth surface to an edge of the center outer electrode on the first surface closer to the fourth surface is M2R; 2.10 mm>E1+ME1+E2+ME2+E3>2.00 mm, |ME1−ME2|<50 m, M2L<M2R, and M1R>M1L are satisfied, or 2.10 mm>E1+ME1+E2+ME2+E3>2.00 mm, |ME1−ME2|<50 μm, M2L>M2R, and M1R<M1L are satisfied; a width from an edge of the second-side second extending portion closer to the third surface to an edge of the second-side outer electrode on the first surface is M3L; and each of M1R/L, M2L/L, M2R/L, and M3L/L about is 1.5% or higher.

According to various preferred embodiments of the present invention, it is possible to provide three-terminal capacitors in which insulation resistance between outer electrodes is less likely to be decreased since the distance between the outer electrodes is maintained even if the position at which a paste for forming an outer electrode is applied is displaced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
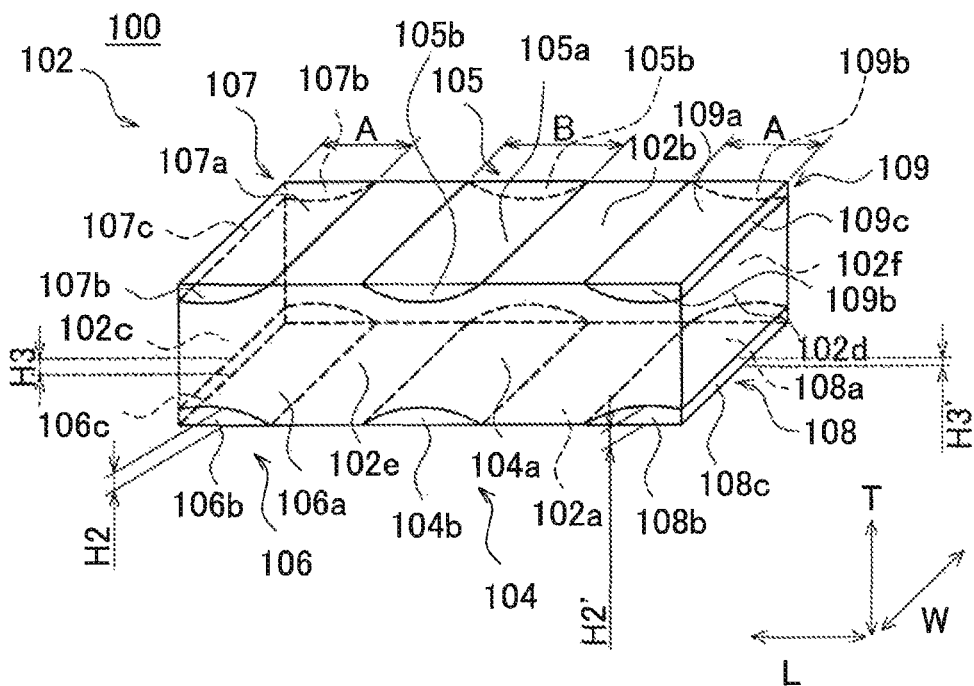
FIG. 1 is an external perspective view of a three-terminal capacitor according to a first preferred embodiment of the present invention.
Figure 2:
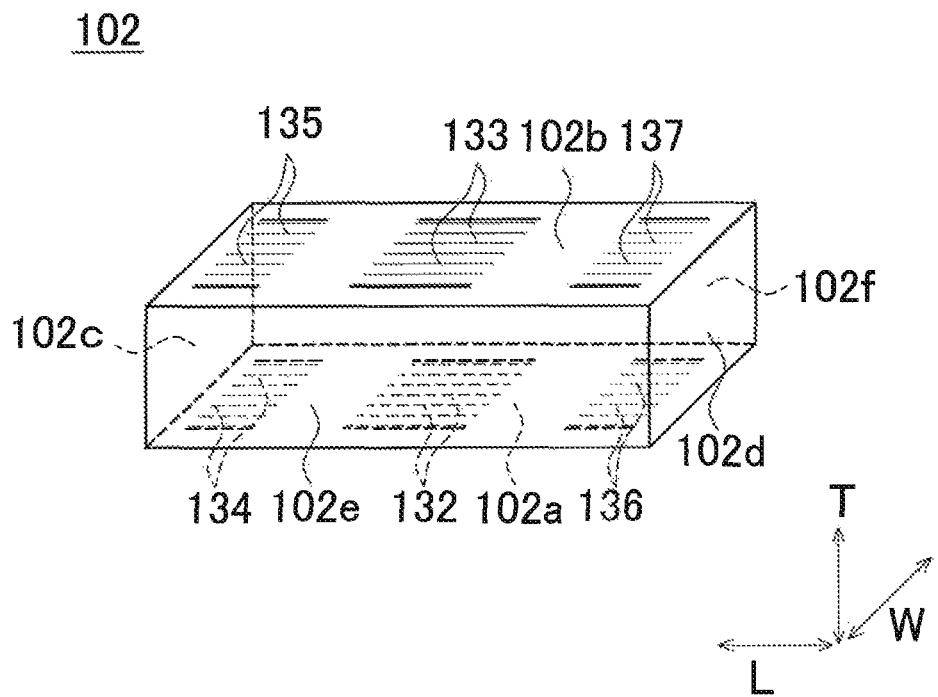
FIG. 2 is a perspective view of a capacitor element of the three-terminal capacitor shown in FIG. 1.
Figure 3:
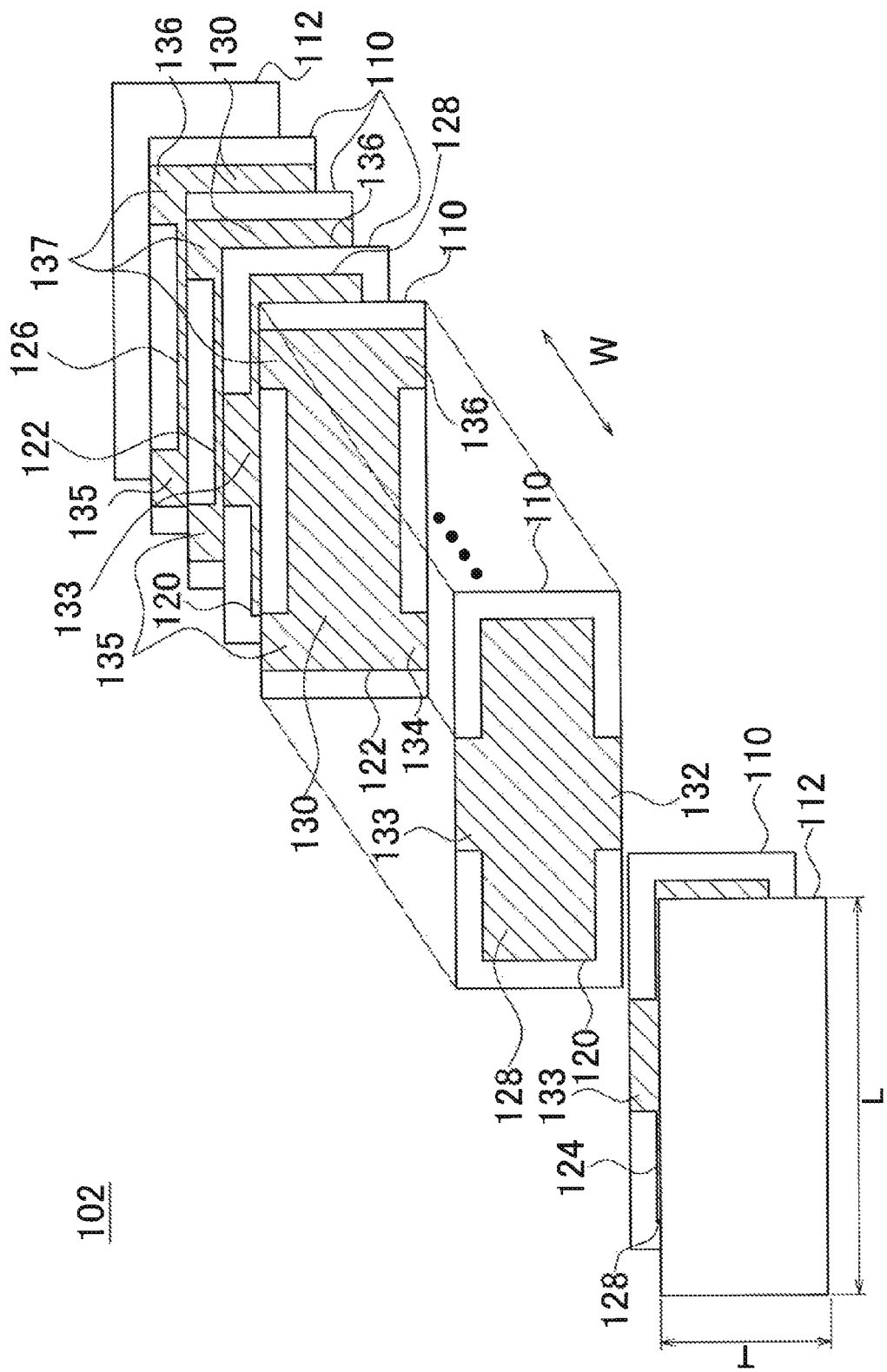
FIG. 3 is an exploded perspective view of the capacitor element shown in FIG. 2.

FIG. 1 is an external perspective view of a three-terminal capacitor 100. FIG. 2 is a perspective view of a capacitor element 102 of the three-terminal capacitor 100 shown in FIG. 1. FIG. 3 is an exploded perspective view of the capacitor element 102 shown in FIG. 2.

The three-terminal capacitor 100 includes a capacitor element 102 preferably having a rectangular or substantially rectangular parallelepiped configuration, center outer electrodes 104 and 105 located at the central portion of the surfaces of the capacitor element 102, and outer electrodes 106, 107, 108, and 109 located at the right and left end portions of the surfaces of the capacitor element 102.

The capacitor element 102 includes first and second surfaces 102a and 102b opposing each other in a thickness direction (top-bottom direction) T. The capacitor element 102 also includes third and fourth surfaces 102c and 102d opposing each other in a length direction (right-left direction) L. The capacitor element 102 also includes fifth and sixth surfaces 102e and 102f opposing each other in a width direction (front-back direction) W.

The dimension of the three-terminal capacitor 100 in the length direction L is preferably about 2.00 to about 2.10 mm, the dimension in the thickness direction T is preferably about 0.7 to about 1.0 mm, and the dimension in the width direction W is preferably about 1.20 to about 1.40 mm, for example.

The dimensions of the three-terminal capacitor 100 in the length direction L, the thickness direction T, and the width direction W may be measured by using a micrometer MDC-25MX made by Mitutoyo Corporation, for example.

The center outer electrode 104 extends from the longitudinal central portion of the first surface 102a to the fifth and sixth surfaces 102e and 102f. The center outer electrode 105 extends from the longitudinal central portion of the second surface 102b to the fifth and sixth surfaces 102e and 102f.

The center outer electrode 104 includes a center outer electrode body 104a and first portions 104b, 104b. The center outer electrode body 104a is electrically connected to a first extending portion 132 of a first conductor layer 120, which will be discussed later. The first portions 104b, 104b extend from both ends of the center outer electrode body 104a. Accordingly, the center outer electrode body 104a is located on the first surface 102a, and the first portions 104b, 104b are located on the fifth and sixth surfaces 102e and 102f.

Similarly, the center outer electrode 105 includes a center outer electrode body 105a and first portions 105b, 105b. The center outer electrode body 105a is electrically connected to a first extending portion 133 of the first conductor layer 120, which will be discussed later. The first portions 105b, 105b extend from both ends of the center outer electrode body 105a. Accordingly, the center outer electrode body 105a is located on the second surface 102b, and the first portions 105b, 105b are located on the fifth and sixth surfaces 102e and 102f.

The side outer electrodes 106 and 108 are respectively disposed at the left and right end portions of the first surface 102a with the center outer electrode 104 therebetween.

More specifically, the side outer electrode 106 extends from one longitudinal end of the first surface 102a to the third, fifth, and sixth surfaces 102c, 102e, and 102f. The side outer electrode 108 extends from the other longitudinal end of the first surface 102a to the fourth, fifth, and sixth surfaces 102d, 102e, and 102f.

The side outer electrode 106 includes an outer electrode body 106a, second portions 106b, 106b, and a third portion 106c. The side outer electrode body 106a is electrically connected to a second extending portion 134 of a second conductor layer 122, which will be discussed later. The second portions 106b, 106b extend from both ends of the side outer electrode body 106a. The third portion 106c extends from one side (toward the third surface 102c) of the side outer electrode body 106a. Accordingly, the side outer electrode body 106a is located on the first surface 102a, the second portions 106b, 106b are located on the fifth and sixth surfaces 102e and 102f, and the third portion 106c is located on the third surface 102c.

Similarly, the side outer electrode 108 includes an outer electrode body 108a, second portions 108b, 108b, and a third portion 108c. The side outer electrode body 108a is electrically connected to a second extending portion 136 of the second conductor layer 122, which will be discussed later. The second portions 108b, 108b extend from both ends of the side outer electrode body 108a. The third portion 108c extends from the other side (toward the fourth surface 102d) of the side outer electrode body 108a. Accordingly, the side outer electrode body 108a is located on the first surface 102a, the second portions 108b, 108b are located on the fifth and sixth surfaces 102e and 102f, and the third portion 108c is located on the fourth surface 102d.

The side outer electrodes 107 and 109 are respectively disposed at the left and right end portions of the second surface 102b with the center outer electrode 105 therebetween.

More specifically, the side outer electrode 107 extends from one longitudinal end of the second surface 102b to the third, fifth, and sixth surfaces 102c, 102e, and 102f. The side outer electrode 109 extends from the other longitudinal end of the second surface 102b to the fourth, fifth, and sixth surfaces 102d, 102e, and 102f.

The side outer electrode 107 includes an outer electrode body 107a, second portions 107b, 107b, and a third portion 107c. The side outer electrode body 107a is electrically connected to a second extending portion 135 of the second conductor layer 122, which will be discussed later. The second portions 107b, 107b extend from both ends of the side outer electrode body 107a. The third portion 107c extends from one side (toward the third surface 102c) of the side outer electrode body 107a. Accordingly, the side outer electrode body 107a is located on the second surface 102b, the second portions 107b, 107b are located on the fifth and sixth surfaces 102e and 102f, and the third portion 107c is located on the third surface 102c.

Similarly, the side outer electrode 109 includes an outer electrode body 109a, second portions 109b, 109b, and a third portion 109c. The side outer electrode body 109a is electrically connected to a second extending portion 137 of the second conductor layer 122, which will be discussed later. The second portions 109b, 109b extend from both ends of the side outer electrode body 109a. The third portion 109c extends from the other side (toward the fourth surface 102d) of the side outer electrode body 109a. Accordingly, the side outer electrode body 109a is located on the second surface 102b, the second portions 109b, 109b are located on the fifth and sixth surfaces 102e and 102f, and the third portion 109c is located on the fourth surface 102d.

With the above-described configuration, one of the first or second surface 102a or 102b defines and serves as a mounting surface of the three-terminal capacitor 100.

In this case, a width B of each of the center outer electrodes 104 and 105 preferably is greater than a width A of each of the side outer electrodes 106 through 109. More specifically, the width B of each of the center outer electrodes 104 and 105 preferably is about 0.63 to about 0.67 mm, while the width A of each of the side outer electrodes 106 through 109 is about 0.35 to about 0.45 mm, for example.

The width B of each of the center outer electrodes 104 and 105 and the width A of each of the side outer electrodes 106 through 109 may be measured by projecting the first or second surface 102a or 102b of the three-terminal capacitor 100 at a magnifying power of 20 by using a measuring microscope MM-60 made by Nikon Corporation, for example.

Each of the center outer electrodes 104 and 105 preferably has a desired thickness by applying a paste once, while each of the side outer electrodes 106 through 109 preferably has a desired thickness by applying a paste twice, for example. As a result, the thickness of the side outer electrodes 106 through 109 is greater than that of the center outer electrodes 104 and 105.

The thickness of each of the center outer electrodes 104 and 105 and the thickness of each of the side outer electrodes 106 through 109 may be measured as follows. By polishing the fifth surface 102e of the three-terminal capacitor 100 toward the center of the width direction, cross sections of the center outer electrodes 104 and 105 and the side outer electrodes 106 through 109 are exposed. Then, after edge rounding caused by polishing is removed, the cross sections of the center outer electrodes 104 and 105 and the side outer electrodes 106 through 109 are projected so as to measure the thicknesses thereof.

In this manner, by forming the thickness of the side outer electrodes 106 through 109 to be greater than that of the center outer electrodes 104 and 105, the three-terminal capacitor 100 is capable of being mounted on a mount board in parallel or substantially in parallel with each other. As a result, the height of the three-terminal capacitor 100 mounted on a mount board is not increased.

Figure 4:
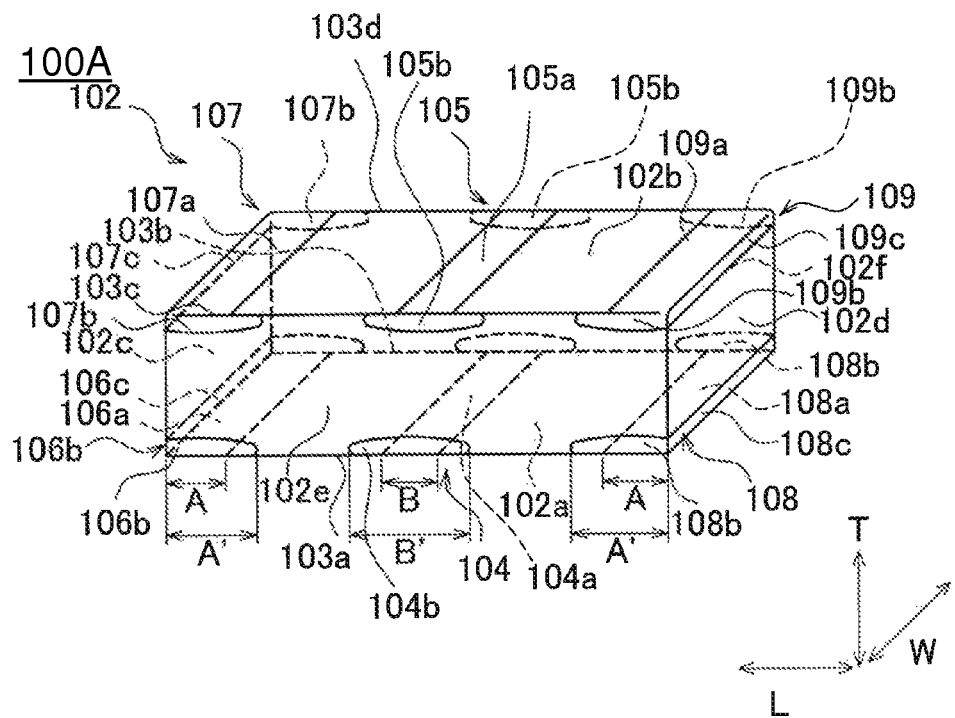
FIG. 4 is an external perspective view of a modified example of the three-terminal capacitor of the first preferred embodiment of the present invention.

FIG. 4 is an external perspective view of a modified example of the three-terminal capacitor 100 shown in FIG. 1.

In the three-terminal capacitor 100A shown in FIG. 4, a width B' of each of the first portions 104b and 105b of the center outer electrodes 104 and 105, respectively, is greater than a width B of each of the center outer electrode bodies 104a and 105a of the center outer electrodes 104 and 105, respectively. Similarly, a width A' of each of the second portions 106b through 109b of the side outer electrodes 106 through 109, respectively, is greater than a width A of the side outer electrode bodies 106a through 109a of the side outer electrodes 106 through 109, respectively. That is, the width B' of each of the first portions 104b and 105b of the center outer electrodes 104 and 105 and the width A' of each of the second portions 106b through 109b of the side outer electrodes 106 through 109 are respectively longer in the length direction L than the width B of each of the center outer electrode bodies 104a and 105a and the width A of each of the side outer electrode bodies 106a through 109a.

In this case, the width B' of the first portion 104b of the center outer electrode 104 is maximized at a boundary portion 103a at which the first surface 102a intersects with the fifth surface 102e and at a boundary portion 103b at which the first surface 102a intersects with the sixth surface 102f. Similarly, the width A' of each of the second portions 106b and 108b of the side outer electrodes 106 and 108 is maximized at the boundary portions 103a and 103b.

The width B' of the first portion 105b of the center outer electrode 105 is maximized at a boundary portion 103c at which the second surface 102b intersects with the fifth surface 102e and at a boundary portion 103d at which the second surface 102b intersects with the sixth surface 102f. Similarly, the width A' of each of the second portions 107b and 109b of the side outer electrodes 107 and 109 is maximized at the boundary portions 103c and 103d.

As discussed above, if the width B' of each of the first portions 104b and 105b of the center outer electrodes 104 and 105 is greater than the width B of each of the center outer electrode bodies 104a and 105a of the center outer electrodes 104 and 105, and if the width A' of each of the second portions 106b through 109b of the side outer electrodes 106 through 109 is greater than the width A of each of the side outer electrode bodies 106a through 109a of the side outer electrodes 106 through 109, it is possible to increase the amount of solder that is wet and is suitably bonded with the first portions 104b and 105b and with the second portions 106b through 109b. Accordingly, the area of fillets formed by solder at the lands of a mount board is decreased while maintaining the bonding strength between the three-terminal capacitor 100A and the mount board. Thus, by mounting the three-terminal capacitor 100A configured as described above on a mount board, the area of land patterns of the mount board is capable of being significantly reduced.

Referring back to FIG. 1, concerning the side outer electrode 106 disposed at one end portion of the first surface 102a in the length direction L, if the higher one of the heights of the longitudinal central portions of the second portions 106b, 106b disposed on the fifth and sixth surfaces 102e and 102f is indicated by H2 and if the height of the widthwise central portion of the third portion 106c disposed on the third surface 102c is indicated by H3, the relationship between the heights H2 and H3 preferably satisfies H2>H3.

Concerning the side outer electrode 108 disposed at the other end portion of the first surface 102a in the length direction L, if the higher one of the heights of the longitudinal central portions of the second portions 108b, 108b disposed on the fifth and sixth surfaces 102e and 102f is indicated by H2' and if the height of the widthwise central portion of the third portion 108c disposed on the fourth surface 102d is indicated by H3', the relationship between the heights H2' and H3' preferably satisfies H2'>H3'.

Concerning the side outer electrode 107 disposed at one end portion of the second surface 102b in the length direction L, if the higher one of the heights of the longitudinal central portions of the second portions 107b, 107b disposed on the fifth and sixth surfaces 102e and 102f is indicated by H2 and if the height of the widthwise central portion of the third portion 107c disposed on the third surface 102c is indicated by H3, the relationship between the heights H2 and H3 preferably satisfies H2>H3.

Concerning the side outer electrode 109 disposed at the other end portion of the second surface 102b in the length direction L, if the higher one of the heights of the longitudinal central portions of the second portions 109b, 109b disposed on the fifth and sixth surfaces 102e and 102f is indicated by H2' and if the height of the widthwise central portion of the third portion 109c disposed on the fourth surface 102d is indicated by H3', the relationship between the heights H2' and H3' preferably satisfies H2'>H3'.

The three-terminal capacitor 100 preferably satisfies the relationships H2>H3 and H2'>H3', as discussed above. Thus, when the three-terminal capacitor 100 is mounted on a mount board by using the first surface 102a as a mounting surface, the amount of solder that is wet and is suitably bonded with the second portions 106b and 108b of the side outer electrodes 106 and 108 is greater than the amount of solder that is wet and is suitably bonded with the third portions 106c and 108c of the side outer electrodes 106 and 108. Accordingly, the positional displacement of the three-terminal capacitor 100 is significantly reduced or prevented, and the bonding strength between the three-terminal capacitor 100 and the mount board is also maintained.

The center outer electrodes 104 and 105 and the side outer electrodes 106 through 109 are preferably made of Ag, Cu, Ni, Pd, or an alloy of such metals. Additionally, a plating film is preferably located on the surface of each of the center outer electrodes 104 and 105 and the side outer electrodes 106 through 109. The plating film protects the center outer electrodes 104 and 105 and the side outer electrodes 106 through 109 and also improves the solderability of the center outer electrodes 104 and 105 and the side outer electrodes 106 through 109.

The center outer electrodes 104 and 105 may be used as ground electrodes, while the side outer electrodes 106 through 109 may be used as signal electrodes, and vice versa.

As shown in FIG. 3, the capacitor element 102 preferably has a multilayer structure including, in the width direction W (stacking direction), a plurality of inner dielectric layers 110, a plurality of first and second conductor layers 120 and 122 which are each disposed at the interface between inner dielectric layers 110, outermost conductor layers 124 and 126 disposed such that they sandwich the plurality of inner dielectric layers 110 therebetween, and outer dielectric layers 112 disposed such that they sandwich the outermost conductor layers 124 and 126 therebetween.

The first conductor layers 120 each include a first opposing portion 128 and first extending portions 132 and 133 respectively extending from the central portion of the first opposing portion 128 downward and upward in the thickness direction T. The first extending portion 132 extends to the central portion of the first surface 102a of the capacitor element 102 and is exposed at the central portion so as to be electrically connected to the center outer electrode 104. The first extending portion 133 extends to the central portion of the second surface 102b of the capacitor element 102 and is exposed at the central portion so as to be electrically connected to the center outer electrode 105.

The second conductor layers 122 each have a second opposing portion 130, second extending portions 134 and 135 respectively extending from the left end portion of the second opposing portion 130 downward and upward in the thickness direction T, and second extending portions 136 and 137 respectively extending from the right end portion of the second opposing portion 130 downward and upward in the thickness direction T. The second extending portion 134 extends to the left end portion of the first surface 102a of the capacitor element 102 and is exposed at the left end portion so as to be electrically connected to the side outer electrode 106. The second extending portion 135 extends to the left end portion of the second surface 102b of the capacitor element 102 and is exposed at the left end portion so as to be electrically connected to the side outer electrode 107. The second extending portion 136 extends to the right end portion of the first surface 102a of the capacitor element 102 and is exposed at the right end portion so as to be electrically connected to the side outer electrode 108. The second extending portion 137 extends to the right end portion of the second surface 102b of the capacitor element 102 and is exposed at the right end portion so as to be electrically connected to the side outer electrode 109.

Figure 5:
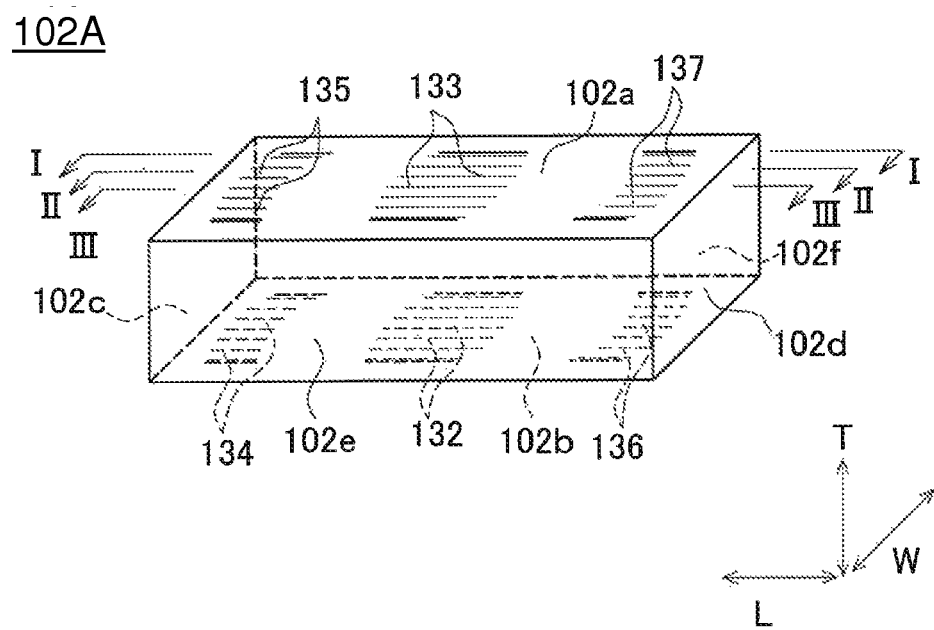
FIG. 5 is a perspective view of a modified example of the capacitor element shown in FIG. 2.
Figure 6:
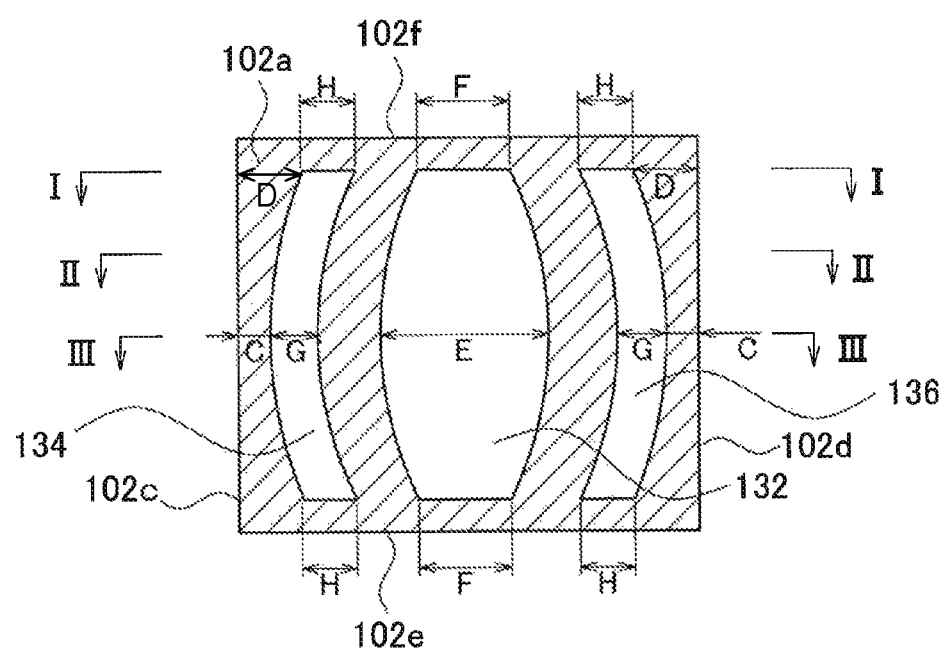
FIG. 6 is a schematic view of extending portions of inner electrodes disposed on a mounting surface of the capacitor element shown in FIG. 5.
Figure 7:
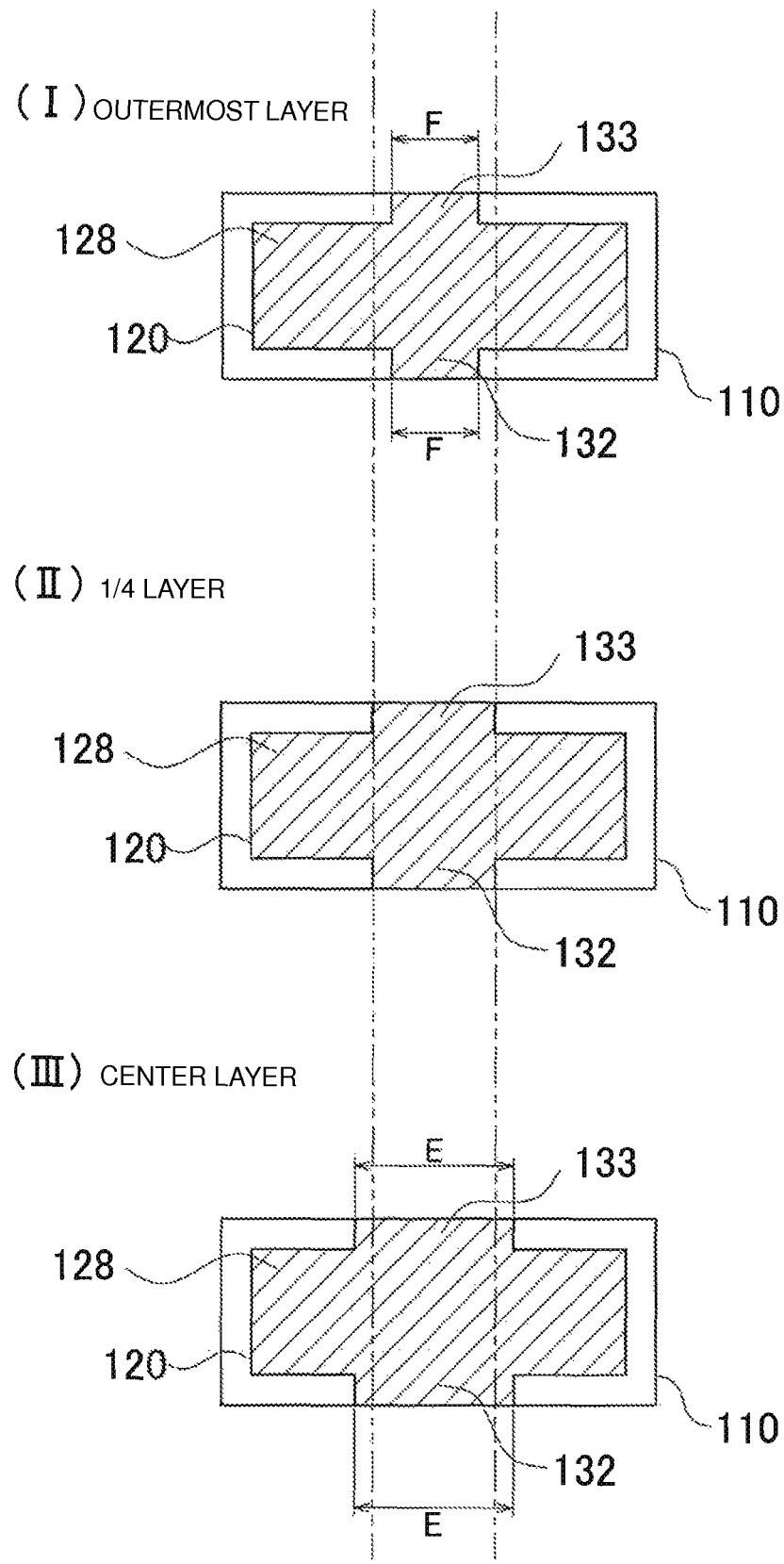
FIG. 7 illustrates a first inner electrode and first extending portions of the capacitor element shown in FIG. 5.
Figure 8:
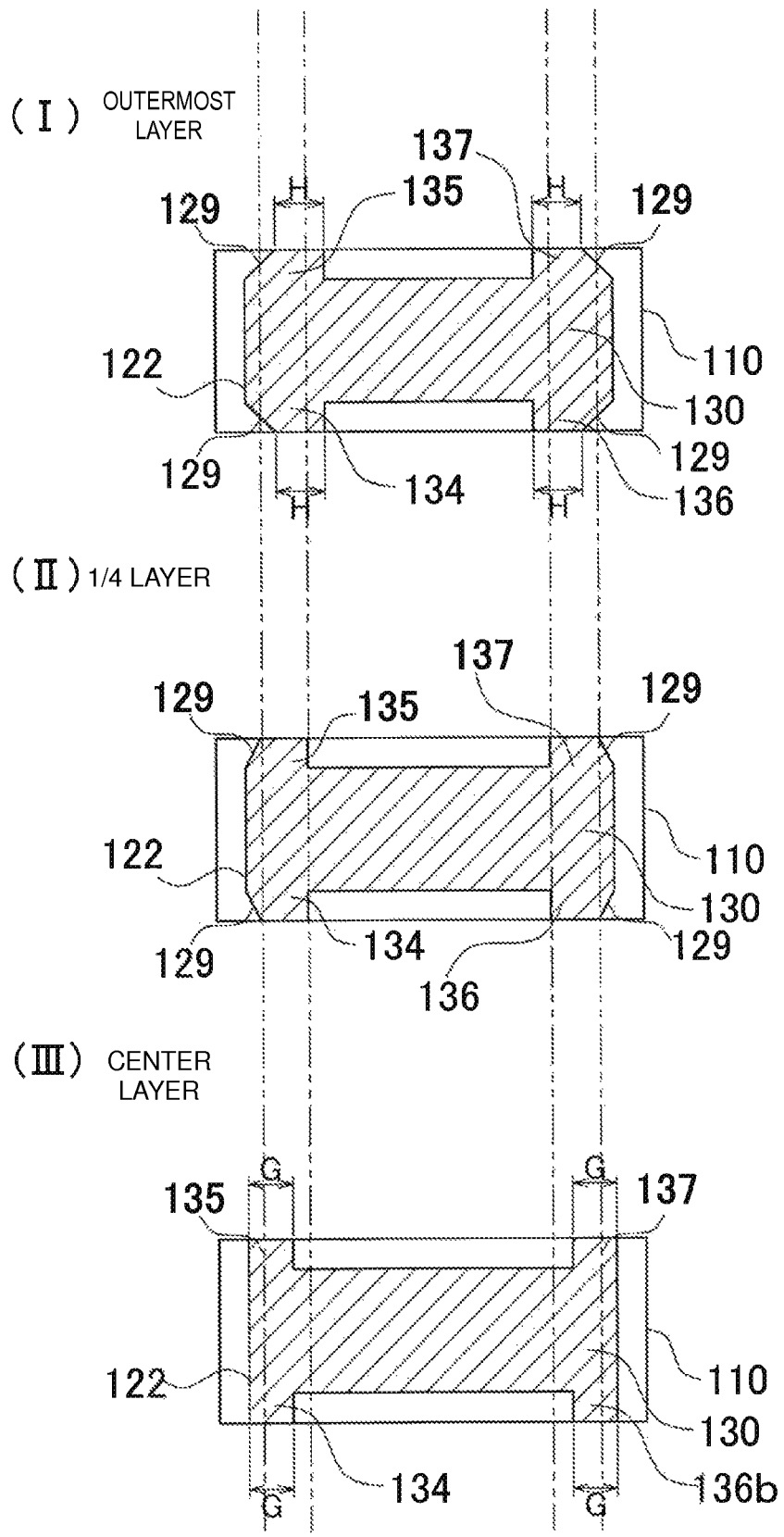
FIG. 8 illustrates a second inner electrode and second extending portions of the capacitor element shown in FIG. 5.

FIG. 5 is a perspective view of a modified example of the capacitor element 102 shown in FIG. 2. FIG. 6 is a schematic view of extending portions of inner electrodes (conductor layers) disposed on a mounting surface of the capacitor element 102A shown in FIG. 5. FIG. 7 illustrates a first inner electrode (first conductor layer 120) and the first extending portions 132 and 133 of the capacitor element 102A shown in FIG. 5. FIG. 8 illustrates a second inner electrode (second conductor layer 122) and the second extending portions 134 through 137 of the capacitor element 102A shown in FIG. 5.

Part (I) of FIG. 7 illustrates the first conductor layer 120 and the first extending portions 132 and 133 taken along line I-I (position in the vicinity of the outermost layer of the capacitor element 102A) of FIG. 5 (perspective view) and FIG. 6 (schematic view). Part (II) of FIG. 7 illustrates the first conductor layer 120 and the first extending portions 132 and 133 taken along line II-II (position in the vicinity of a layer disposed farther inward than the outermost layer of the capacitor element 102A by about ¼ of the width W) of FIGS. 5 and 6. Hereinafter, the layer shown in part (II) of FIG. 7 will be referred to as a "¼ layer"). Part (III) of FIG. 7 illustrates the first conductor layer 120 and the first extending portions 132 and 133 taken along line III-III (position in the vicinity of a layer disposed farther inward than the outermost layer of the capacitor element 102A by about ½ of the width W) of FIGS. 5 and 6. Hereinafter, the layer shown in part (III) of FIG. 7 will be referred to as a "center layer").

A width E of the exposed portions of the first extending portions 132 and 133 of the first conductor layer 120 disposed near the center layer of the capacitor element 102A is preferably greater than a width F of the exposed portions of the first extending portions 132 and 133 of the first conductor layer 120 disposed near the outermost layer of the capacitor element 102A. The width of the exposed portions of the first extending portions 132 and 133 is gradually increased from the position near the outermost layer to the position near the center layer.

Part (I) of FIG. 8 illustrates the second conductor layer 122 and the second extending portions 134 through 137 taken along line I-I of FIGS. 5 and 6. Part (II) of FIG. 8 illustrates the second conductor layer 122 and the second extending portions 134 through 137 taken along line II-II of FIGS. 5 and 6. Part (III) of FIG. 8 illustrates the second conductor layer 122 and the second extending portions 134 through 137 taken along line III-III of FIGS. 5 and 6.

A width G of the exposed portions of the second extending portions 134 through 137 of the second conductor layer 122 disposed near the center layer of the capacitor element 102A is preferably greater than a width H of the exposed portions of the second extending portions 134 through 137 of the second conductor layer 122 disposed near the outermost layer of the capacitor element 102A. The width of the exposed portions of the second extending portions 134 through 137 is gradually increased from the position near the outermost layer to the position near the center layer.

As shown in FIG. 6, the exposed portions of the second extending portions 134 and 135 of the second conductor layer 122 disposed near the center layer of the capacitor element 102A are separated from the third surface (end surface) 102c of the capacitor element 102A by a distance C. Similarly, the exposed portions of the second extending portions 136 and 137 of the second conductor layer 122 disposed near the center layer of the capacitor element 102A is separated from the fourth surface (end surface) 102d of the capacitor element 102A by a distance C. Meanwhile, the exposed portions of the second extending portions 134 and 135 of the second conductor layer 122 disposed near the outermost layer of the capacitor element 102A are separated from the third surface 102c of the capacitor element 102A by a distance D. Similarly, the exposed portions of the second extending portions 136 and 137 of the second conductor layer 122 disposed near the outermost layer of the capacitor element 102A are separated from the fourth surface 102d of the capacitor element 102A by a distance D. The distance D is preferably greater than the distance C.

In order to set the distance D to be greater than the distance C, the second extending portions 134 through 137 are preferably configured as follows. As shown in FIG. 8, the second extending portions 134 through 137 of the second conductor layer 122 disposed near the outermost layer of the capacitor element 102A each include an oblique section 129, so that the exposed portions of the second extending portions 134 through 137 are positioned toward the center (inward). Then, by setting the angle of the oblique section 129 to increase from the position of the second conductor layer 122 near the outermost layer to the position of the second conductor layer 122 near the center layer, the positions of the exposed portions of the second extending portions 134 through 137 are shifted gradually toward outward.

Table 1 indicates examples of specific numeric values of the distances between the exposed portions of the second extending portions 134 and 135 (second extending portions 136 and 137) and the third surface 102c (fourth surface 102d) of the capacitor element 102A, the widths of the exposed portions of the second extending portions 134 through 137, and the widths of the exposed portions of the first extending portions 132 and 133, at the position of line I-I (position near the outermost layer), the position of line II-II, and the position of line III-III (position near the center layer) of FIG. 6. In Table 1, α is a numeric value equal to the distance C between the exposed portions of the second extending portions 134 and 135 (second extending portions 136 and 137) near the center layer and the third surface 102c (fourth surface 102d) of the capacitor element 102A.

TABLE 1

|  | Distance between exposed portions of second extending portions and end surfaces of capacitor element | Width of exposed portions of second extending portions | Width of exposed portions of first extending portions |
| --- | --- | --- | --- |
| Position of line I-I | α + 40 μm (= D) | 230 μm (= H) | 460 μm (= F) |
| Position of line II-II | α + 20 μm | 240 μm | 480 μm |
| Position of line III-III | αμm (= C) | 250 μm (= G) | 500 μm (= E) |

By setting the distance D to be greater than the distance C in this manner, it is possible to obtain a three-terminal capacitor 100 in which cracks are less likely to occur near the outermost layer of the capacitor element 102A.

If the width G of the exposed portion of the second extending portions 134 through 137 of the second conductor layer 122 disposed near the center layer of the capacitor element 102A is preferably greater than the width H of the exposed portion of the second extending portions 134 through 137 of the second conductor layer 122 disposed near the outermost layer of the capacitor element 102A, cracks are even less likely to occur near the outermost layer of the capacitor element 102A.

If the width E of the exposed portions of the first extending portions 132 and 133 of the first conductor layer 120 disposed near the center layer of the capacitor element 102A is preferably greater than the width F of the exposed portions of the first extending portions 132 and 133 of the first conductor layer 120 disposed near the outermost layer of the capacitor element 102A, the electrical distance between the center outer electrodes 104 and 105 and the side outer electrodes 106 through 109 near the center of the capacitor element 102A is decreased so as to be equal or substantially equal to the electrical distance between the center outer electrodes 104 and 105 and the side outer electrodes 106 through 109 near the outermost layer of the capacitor element 102A. As a result, the equivalent series inductance (ESL) becomes uniform, and also, it is decreased.

Figure 9A:
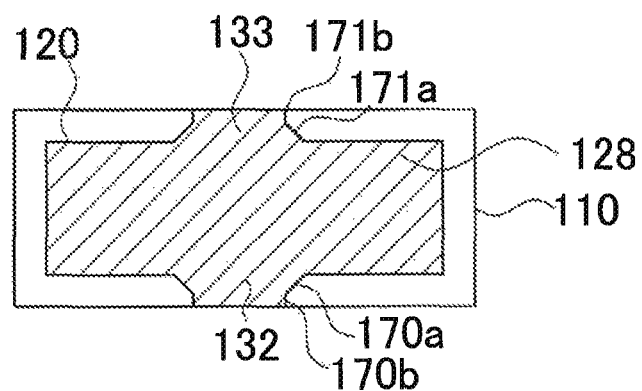
FIGS. 9A and 9B are schematic sectional views of another modified example of the three-terminal capacitor shown in FIG. 1.
Figure 9B:
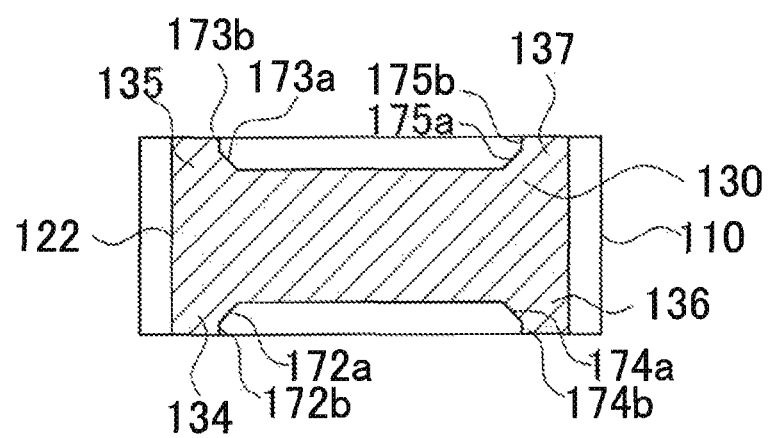

FIGS. 9A and 9B are schematic sectional views of another modified example of the three-terminal capacitor 100 shown in FIG. 1.

As shown in FIG. 9A, the first extending portion 132 may include a double-sided oblique section 170a at a position closer to the first opposing portion 128 and a straight-line section 170b at a position closer to the first surface 102a. The double-sided oblique section 170a extends obliquely in two directions toward the second extending portions 134 and 136. Similarly, the first extending portion 133 may include a double-sided oblique section 171a at a position closer to the first opposing portion 128 and a straight-line section 171b at a position closer to the second surface 102b. The double-sided oblique section 171a extends obliquely in two directions toward the second extending portions 135 and 137.

As shown in FIG. 9B, the second extending portion 134 may include a single-sided oblique section 172a at a position closer to the second opposing portion 130 and a straight-line section 172b at a position closer to the first surface 102a. The single-sided oblique section 172a extends obliquely in one direction toward the first extending portion 132. Similarly, the second extending portion 135 may include a single-sided oblique section 173a at a position closer to the second opposing portion 130 and a straight-line section 173b at a position closer to the second surface 102b. The single-sided oblique section 173a extends obliquely in one direction toward the first extending portion 133. The second extending portion 136 may include a single-sided oblique section 174a at a position closer to the second opposing portion 130 and a straight-line section 174b at a position closer to the first surface 102a. The single-sided oblique section 174a extends obliquely in one direction toward the first extending portion 132. The second extending portion 137 may include a single-sided oblique section 175a at a position closer to the second opposing portion 130 and a straight-line section 175b at a position closer to the second surface 102b. The single-sided oblique section 175a extends obliquely in one direction toward the first extending portion 133.

Accordingly, the first extending portions 132 and 133 preferably include the double-sided oblique sections 170a and 171a extending obliquely toward the second extending portions 134 through 137, while the second extending portions 134 through 137 include the single-sided oblique sections 172a through 175a extending obliquely toward the first extending portions 132 and 133. Thus, the electrical distance between the center outer electrodes 104 and 105 and the side outer electrodes 106 through 109 (for example, the distance in a path: center outer electrode 104→first extending portion 132→first conductor layer 120→dielectric layer 110→second conductor layer 122→second extending portion 136→and outer electrode 108) is decreased. As a result, it is possible to decrease the ESL.

Additionally, the first extending portions 132 and 133 include the straight-line sections 170b and 171b, and the second extending portions 134 through 137 include the straight-line sections 172b through 175b. Accordingly, even if the position at which the outer shape of the first extending portions 132 and 133 and the second extending portions 134 through 137 is cut is displaced in the thickness direction T, the widths of the exposed portions of the first extending portions 132 and 133 and the second extending portions 134 through 137 remain the same and are not increased. Thus, the exposed portions of the first extending portions 132 and 133 and the second extending portions 134 through 137 are not connected to thin portions of the center outer electrodes 104 and 105 and the side outer electrodes 106 through 109. As a result, it is unlikely that moisture will permeate into the three-terminal capacitor 100 at positions at which the center outer electrodes 104 and 105 and the side outer electrodes 106 through 109 are located, thus more than sufficient ensuring moisture sealing characteristics.

The first conductor layer 120 and the second conductor layer 122 oppose each other in the width direction W with the inner dielectric layer 110, which is made of a dielectric material, therebetween. At the portion at which the first and second conductor layers 120 and 122 oppose each other with the inner dielectric layer 110 therebetween (portion at which the first opposing portion 128 of the first conductor layer 120 opposes the second opposing portion 130 of the second conductor layer 122), electrostatic capacitance is produced. The first and second conductor layers 120 and 122 are preferably made of Ag, Cu, Ni, Pd, or an alloy of such metals. The inner dielectric layer 110 and the outer dielectric layer 112 preferably made of, for example, a barium titanate material or a strontium titanate material. The average thickness of the first and second conductor layers 120 and 122 preferably is about 1.0 mm or smaller, for example. For ensuring electrical continuity, the average thickness of the first and second conductor layers 120 and 122 is about 0.3 mm or greater, for example.

Figure 10:
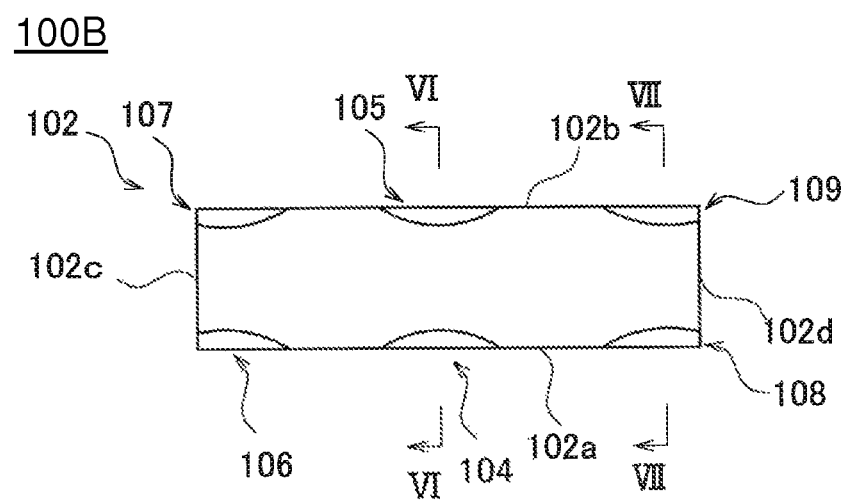
FIG. 10 is a schematic front view of a fifth surface of a capacitor element of another modified example of the three-terminal capacitor of the first preferred embodiment of the present invention.
Figure 11A:
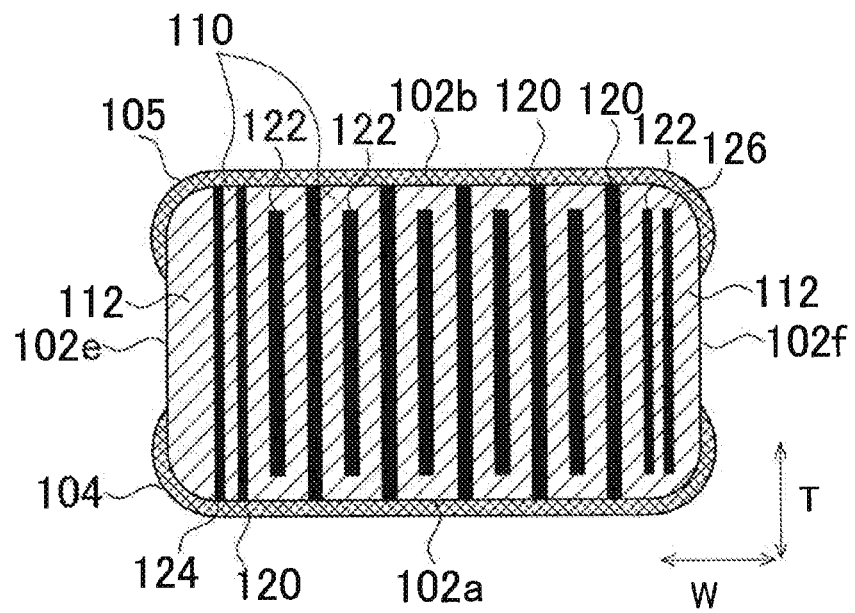
FIGS. 11A and 11B are schematic sectional views taken along lines VI-VI and VII-VII, respectively, of FIG. 10.
Figure 11B:
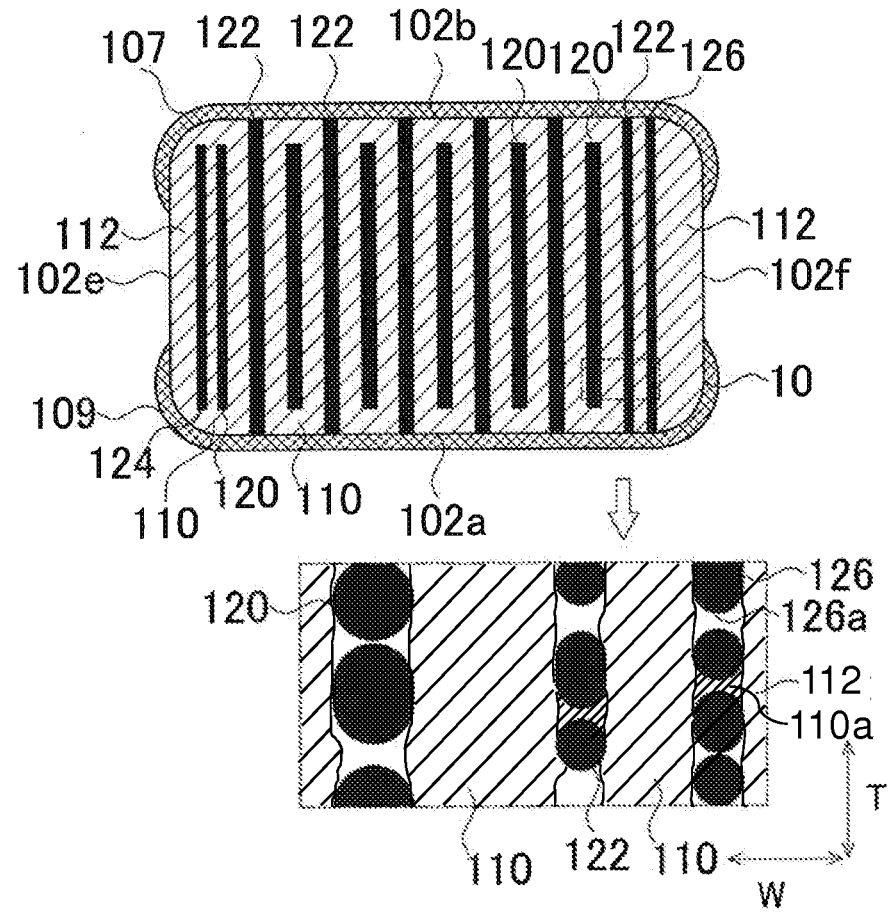
Figure 12:
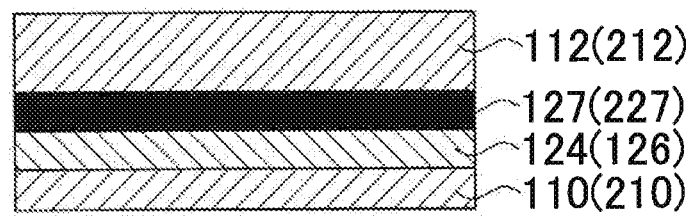
FIG. 12 illustrates the interface between an outer dielectric layer and an outermost conductor layer with a boundary layer therebetween.

FIG. 10 is a schematic front view of the fifth surface 102e of the capacitor element 102 of another modified example of the three-terminal capacitor 100 shown in FIG. 1. FIG. 11A is a schematic sectional view taken along line IV-IV of FIG. 10, and FIG. 11B is a schematic sectional view taken along line V-V of FIG. 10. FIG. 12 illustrates the interface between the outer dielectric layer 112 (212) and the outermost conductor layer 124 (126) with a boundary layer 127 therebetween.

The thickness of the outermost conductor layers 124 and 126 preferably is smaller than that of the first or second conductor layer 120 or 122 positioned near the center of the width direction W. The thickness of the central portions of the outermost conductor layers 124 and 126 preferably is about 0.8 mm or smaller, for example. For ensuring electrical continuity, the average thickness of the outermost conductor layers 124 and 126 preferably is about 0.3 mm or greater, for example.

The coverage of the conductor layers tends to be gradually thinner from the center to both sides in the width direction W. Accordingly, the coverage of the outermost conductor layers 124 and 126 is thinner than that of the first or second conductor layer 120 or 122. The coverage is defined by the ratio of the total length of conductor particles in cross section to the total length of a conductor layer in cross section. To calculate the coverage, measurements are made by exposing a side surface in the L direction and the thickness direction T (LT surface) of the three-terminal capacitor 100B and by polishing the exposed side surface, for example.

Preferably, the coverage of the outermost conductor layers 124 and 126 is, for example, about 0.4 to about 0.85 times as large as the coverage of the first or second conductor layer 120 or 122 near the center in the thickness direction T. In this manner, due to the intermittent concentration of conductor particles, the coverage of the outermost conductor layers 124 and 126 is decreased, and as a result, a missing portion 126a is produced, as shown in FIG. 11B. If the coverage of the outermost conductor layers 124 and 126 is less than about 0.4 times as large as the coverage of the first or second conductor layer 120 or 122 near the center in the thickness direction T, for example, it is difficult to secure electrical continuity. Conversely, if the coverage of the outermost conductor layers 124 and 126 is more than about 0.85 times as large as the coverage of the first or second conductor layer 120 or 122, for example, the interlayer adhesion force is not sufficiently enhanced.

In the missing portion 126a, a pillar 110a that couples the dielectric layers with the outermost conductor layers 124 and 126 therebetween is provided. This pillar 110a preferably contains at least one of Si, Al, and barium titanate ($BaTiO_3$) segregated from the dielectric layers. Such segregated material contained in the pillar 110a may be analyzed and observed by a field emission wavelength-dispersive X-ray spectrometer (FE-WDX), for example.

In order to enhance the formation of a pillar 110a that couples the inner dielectric layers 110, $SiO_2$ is preferably added to the inner dielectric layers 110. The ratio of Si to Ti in the inner dielectric layers 110 is preferably about 1.3 mol % or higher, and in order to secure the function of a capacitor, it is preferably about 3.0 mol % or lower, for example. In order to enhance the formation of a pillar 110a that couples dielectric layers, Al is preferably added to the dielectric layers. In order to enhance the formation of a pillar 110a that couples dielectric layers, barium titanate ($BaTiO_3$), which is the same material for the dielectric layers, is preferably added to conductor layers.

The outermost conductor layer 124 is connected to the center outer electrodes 104 and 105, as in the first conductor layer 120 disposed adjacent to the outermost conductor layer 124 with the inner dielectric layer 110 therebetween. The outermost conductor layer 126 is connected to the side outer electrodes 106 through 109, as in the second conductor layer 122 disposed adjacent to the outermost conductor layer 126 with the inner dielectric layer 110 therebetween.

As shown in FIG. 12, the boundary layer 127 in which Mg, Mn, and Ni coexist is disposed between the outermost conductor layer 124 or 126 and the outermost dielectric layer 112. The boundary layer 127 can be formed by Mg and Mn diffused into the outermost conductor layer 124 or 126 including Ni, so as to include a Mg—Mn—Ni coexistence region.

Preferably, the boundary layer 127 occupies about 69% or higher of the boundary space between the outer dielectric layer 112 and the outermost conductor layer 124 or 126, for example. The ratio of the boundary layer 127 is calculated by the expression (the total length of the boundary layer in which Mg and Mn are contained)/(the length of the conductor layer)×100. In this case, the length of the conductor layer in the above-described expression is a length of the conductor layer from which a portion of the conductor layer which is missing due to voids or the segregation of Si is removed.

In the Mg—Mn—Ni coexistence region, the molar ratio of Mg and Mn to Ni is preferably about 0.1 to about 0.8, and the areal ratio of Mg and Mn to Ni is preferably about 30% or higher, and more preferably, about 70% or higher, for example.

In this manner, if the thickness of the outermost conductor layers 124 and 126 is smaller than that of the first or second conductor layer 120 or 122, the interlayer adhesion force between dielectric layers adjacent to each other with the outermost conductor layer 124 or 126 therebetween is enhanced. As a result, it is possible to significantly reduce or prevent the occurrence of cracks and to significantly reduce or prevent a decrease in the function of a capacitor.

If the coverage of the outermost conductor layers 124 and 126 is about 0.4 to about 0.85 times as large as the coverage of the first or second conductor layer 120 or 122 near the center in the thickness direction T, the coverage is decreased due to the intermittent concentration of conductor particles, thus producing a missing portion 126a, as shown in FIG. 11B. In the missing portion 126a, a pillar 110a is configured by a dielectric layer containing, for example, barium titanate or silica. The presence of the pillar 110a enhances coupling between the dielectric layers disposed adjacent to each other with the outermost conductor layer 124 or 126 therebetween through particles of the outermost conductor layer 124 or 126, thus enhancing the interlayer adhesion force therebetween. As a result, the occurrence of cracks is significantly reduced or prevented and the function of a capacitor is less likely to be decreased.

The outermost conductor layer 124 is connected to the center outer electrodes 104 and 105, as in the first conductor layer 120 adjacent to the outermost conductor layer 124 with the inner dielectric layer 110 therebetween. The outermost conductor layer 126 is connected to the side outer electrodes 106 through 109, as in the second conductor layer 122 adjacent to the outermost conductor layer 126 with the inner dielectric layer 110 therebetween. In this case, the outermost conductor layers 124 and 126 do not substantially contribute to the generation of electrostatic capacitance. Accordingly, even if cracks occur in or near the outermost conductor layer 124 or 126, the function of a capacitor is less likely to be decreased.

If the boundary layer 127 disposed between the outermost conductor layer 124 or 126 and the outermost dielectric layer 112 includes a Mg—Mn—Ni coexistence region in which Mg and Mn are segregated, as shown in FIG. 12, the boundary layer 127, which contains an oxide compound of Mg, Mn, and Ni, has a strong adhesion with a dielectric layer. As a result, the occurrence of cracks is significantly reduced or prevented and the function of a capacitor is less likely to be decreased. The detection of a boundary layer is conducted by observing a cross section including the boundary layer by using a FE-WDX, for example.

Figure 13A:
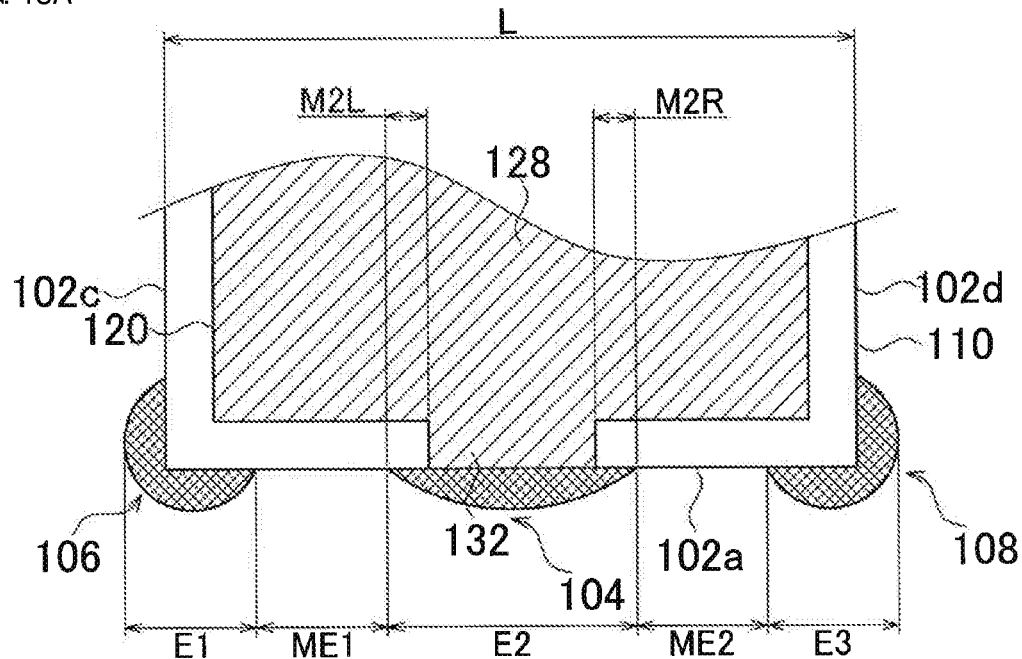
FIGS. 13A and 13B are schematic sectional views of the three-terminal capacitor of the first preferred embodiment of the present invention.
Figure 13B:
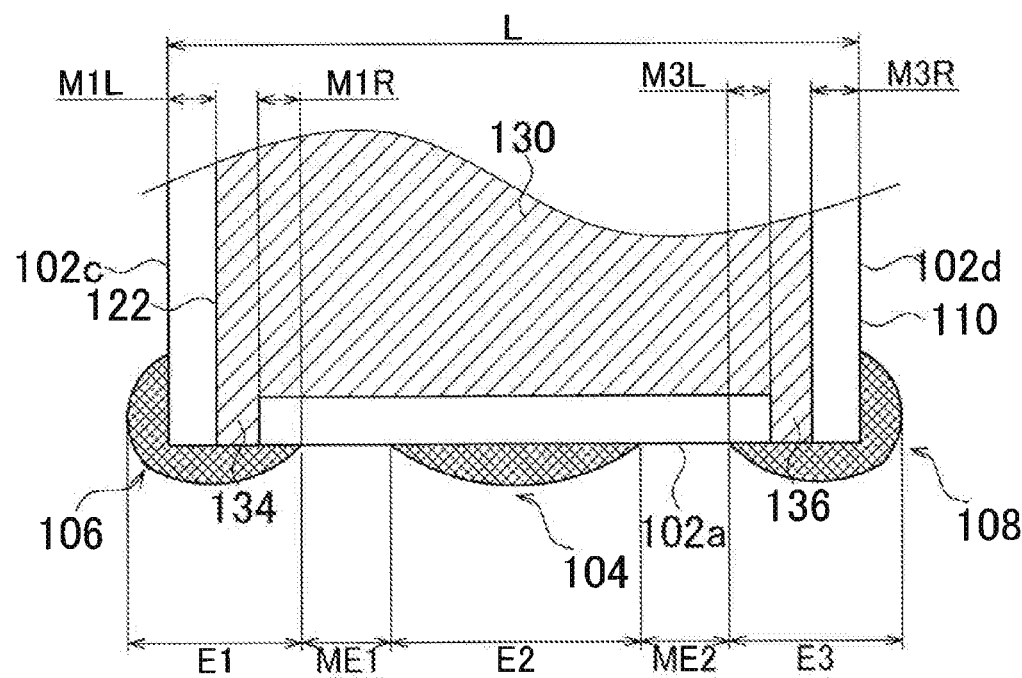

FIGS. 13A and 13B are schematic sectional views of the three-terminal capacitor 100B of the first preferred embodiment. The center outer electrode 105 and the side outer electrodes 107 and 109 located on the second surface 102b are similar to the counterparts located on the first surface 102a, and thus, they are not shown.

The length of the side outer electrode 106 in the length direction L is indicated by E1, the length of the center outer electrode 104 in the length direction L is indicated by E2, and the length of the side outer electrode 108 in the length direction L is indicated by E3. The distance between the side outer electrode 106 and the center outer electrode 104 is indicated by ME1, and the distance between the side outer electrode 108 and the center outer electrode 104 is indicated by ME2. The width from an edge of the second extending portion 134 closer to the third surface 102c to the third surface 102c is indicated by M1L, and the width from an edge of the second extending portion 134 closer to the fourth surface 102d to the edge of the side outer electrode 106 on the first surface 102a is indicated by M1R. The width from an edge of the first extending portion 132 closer to the third surface 102c to an edge of the center outer electrode 104 on the first surface 102a closer to the third surface 102c is indicated by M2L, and the width from an edge of the first extending portion 132 closer to the fourth surface 102d to an edge of the center outer electrode 104 on the first surface 102a closer to the fourth surface 102d is indicated by M2R. The width from an edge of the second extending portion 136 closer to the third surface 102c to the edge of the side outer electrode 108 on the first surface 102a is indicated by M3L, and the width from an edge of the second extending portion 136 closer to the fourth surface 102d to the fourth surface 102d is indicated by M3R. Although the dimension of each of the center outer electrode 105 and the side outer electrodes 106 and 108 may vary in the thickness direction, the dimensions E1, E2, E3, ME1, ME2, M1L, M1R, M2L, M2R, M3L, and M3R are all measured in the same cross section.

In this case, the three-terminal capacitor 100B satisfies the following conditions. The total dimension of E1+ME1+E2+ME2+E3 is greater than the dimension of the capacitor element 102 in the length direction L (hereinafter will be referred to as the "L dimension"). The side outer electrode 106 includes the third portion 106c on the third surface 102c, while the side outer electrode 108 includes the third portion 108c on the fourth surface 102d. In this case, the three-terminal capacitor 100B preferably satisfies |ME1−ME2|<about 50 µm, and also preferably satisfies M2L<M2R, and M1R>M1L, or M2L>M2R and M1R<M1L.

It is preferable that the ratio of each of M1R, M2L, M2R, and M3L to the L dimension is about 1.5% or higher, for example.

The dimensions E1, E2, E3, ME1, ME2, M1L, M1R, M2L, M2R, M3L, and M3R are measured as follows. In the state in which a side surface in the length direction L and the thickness direction T (LT surface) of the three-terminal capacitor 100B is exposed, the three-terminal capacitor 100B is fixed. Then, the three-terminal capacitor 100B is polished until the depth of about ½ in the width direction W by using a polishing machine so as to expose the first and second conductor layers 120 and 122. Then, after the polished surfaces of the first and second conductor layers 120 and 122 are worked so as to eliminate edge rounding, they are observed from the fifth surface 102e of the three-terminal capacitor 100B by using an optical microscope, thereby measuring the dimensions, for example.

In the three-terminal capacitor 100B configured as described above, the first and second conductor layers 120 and 122 preferably are disposed perpendicularly or substantially perpendicularly to the first surface 102a or the second surface 102b (in other words, the mounting surface) of the three-terminal capacitor 100B, and the stacking direction is parallel or substantially parallel with the first or second surface 102a or 102b (in other words, the mounting surface).

Second Preferred Embodiment

Figure 14:
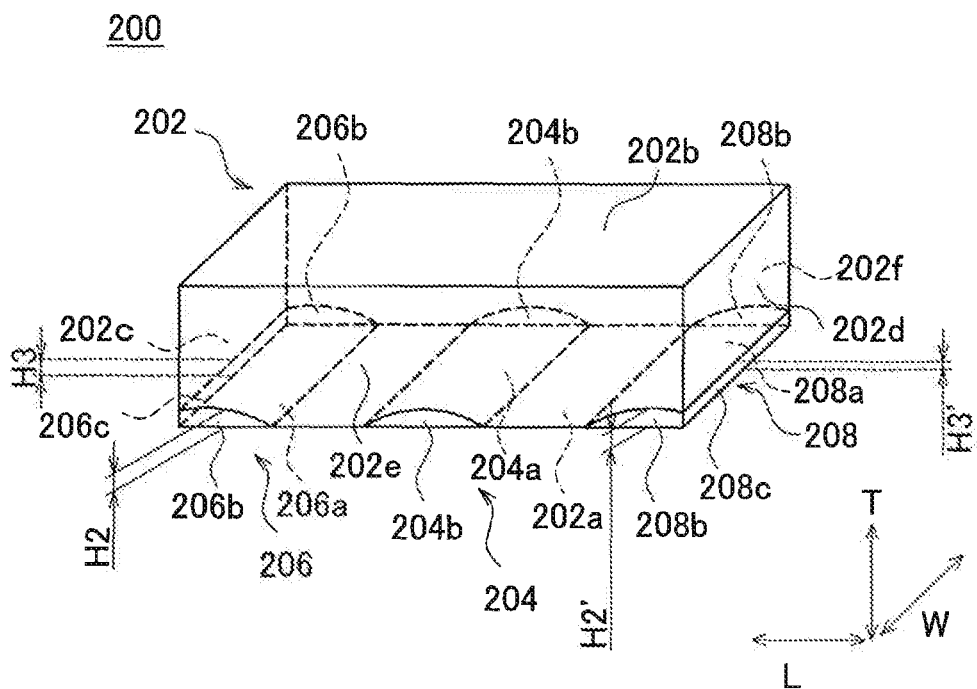
FIG. 14 is an external perspective view of a three-terminal capacitor according to a second preferred embodiment of the present invention.
Figure 15:
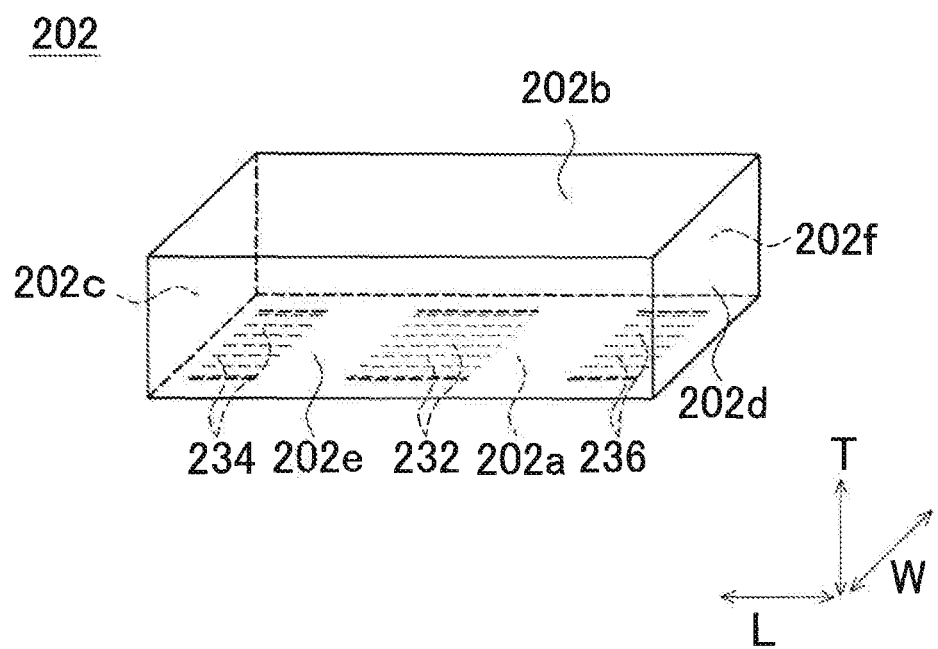
FIG. 15 is a perspective view of a capacitor element of the three-terminal capacitor shown in FIG. 14.
Figure 16:
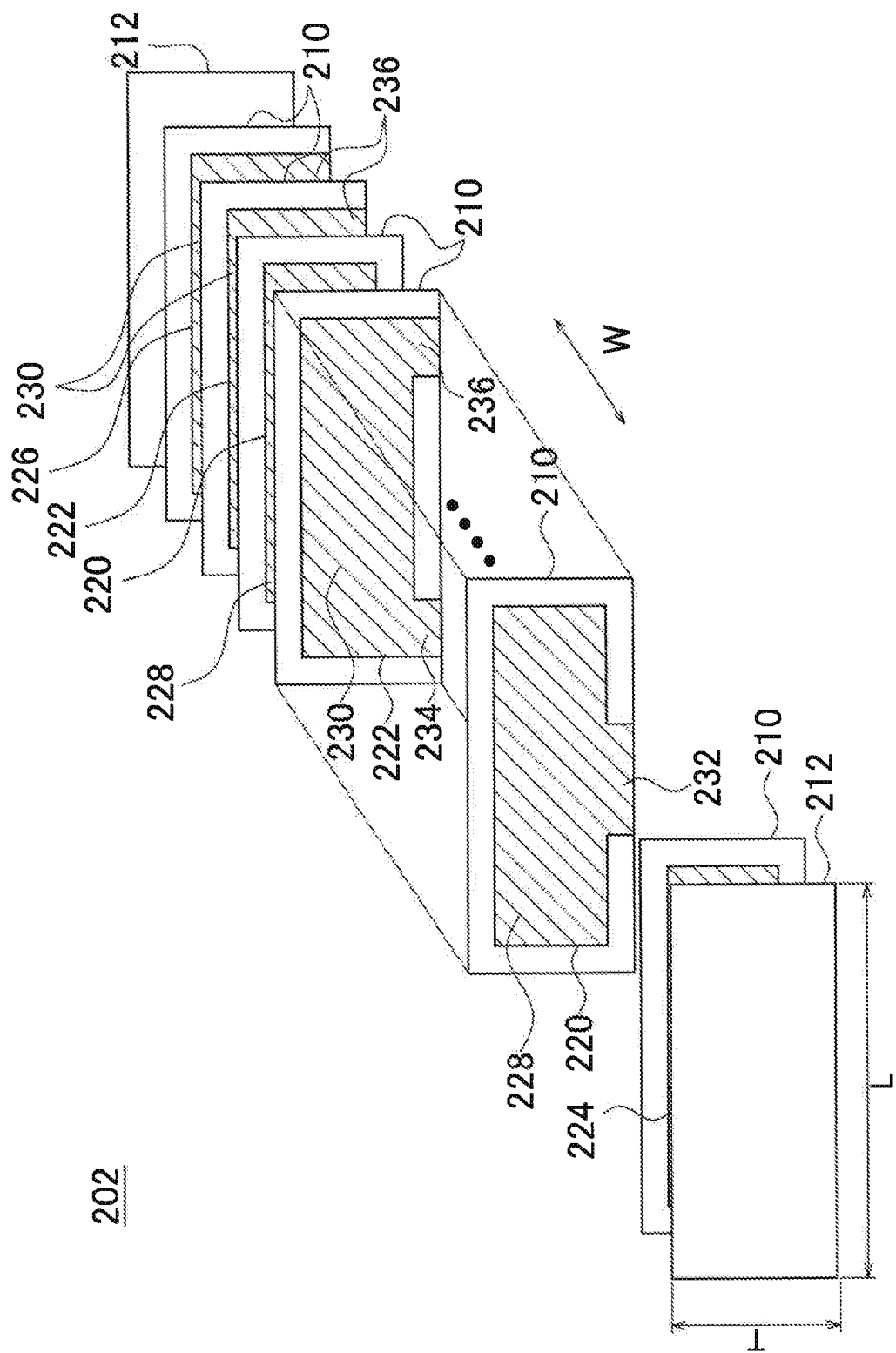
FIG. 16 is an exploded perspective view of the capacitor element shown in FIG. 15.

FIG. 14 is an external perspective view of a three-terminal capacitor 200, which is a multilayer ceramic electronic component. FIG. 15 is a perspective view of a capacitor element 202 of the three-terminal capacitor 200 shown in FIG. 14. FIG. 16 is an exploded perspective view of the capacitor element 202 shown in FIG. 15.

The three-terminal capacitor 200 is similar to the three-terminal capacitor 100 of the first preferred embodiment from which the first extending portion 133 of the first conductor layer 120 and the second extending portions 135 and 137 of the second conductor layer 122 are removed or are never provided. Accordingly, the three-terminal capacitor 200 is similar to the three-terminal capacitor 100 from which the center outer electrode 105 and the side outer electrodes 107 and 109 are removed or are never provided.

The three-terminal capacitor 200 includes a capacitor element 202 preferably having a rectangular or substantially rectangular parallelepiped shape, a center outer electrode 204 located at the central portion of the surface of the capacitor element 202, and end outer electrodes 206 and 208 respectively located at the left and right end portions of the surface of the capacitor element 202.

The capacitor element 202 includes first and second surfaces 202a and 202b opposing each other in a thickness direction (top-bottom direction) T. The capacitor element 202 also includes third and fourth surfaces 202c and 202d opposing each other in a length direction (right-left direction) L. The capacitor element 202 also includes fifth and sixth surfaces 202e and 202f opposing each other in a width direction (front-back direction) W.

The dimension of the three-terminal capacitor 200 in the length direction L is preferably about 2.00 mm to about 2.10 mm, the dimension in the thickness direction T is preferably about 0.7 mm to about 1.0 mm, and the dimension in the width direction W is preferably about 1.20 mm to about 1.40 mm, for example.

The dimensions of the three-terminal capacitor 200 in the length direction L, the thickness direction T, and the width direction W may be measured by using a micrometer MDC-25MX made by Mitutoyo Corporation, for example.

The center outer electrode 204 extends from the longitudinal central portion of the first surface 202a to the fifth and sixth surfaces 202e and 202f.

The center outer electrode 204 includes a center outer electrode body 204a and first portions 204b, 204b. The center outer electrode body 204a is electrically connected to a first extending portion 232 of a first conductor layer 220, which will be discussed later. The first portions 204b, 204b extend from both ends of the center outer electrode body 204a. Accordingly, the center outer electrode body 204a is located on the first surface 202a, and the first portions 204b, 204b are located on the fifth and sixth surfaces 202e and 202f.

The side outer electrodes 206 and 208 are respectively disposed at the left and right end portions of the first surface 202a with the center outer electrode 204 therebetween.

More specifically, the side outer electrode 206 extends from one longitudinal end of the first surface 202a to the third, fifth, and sixth surfaces 202c, 202e, and 202f. The side outer electrode 208 extends from the other longitudinal end of the first surface 202a to the fourth, fifth, and sixth surfaces 202d, 202e, and 202f.

The side outer electrode 206 includes an outer electrode body 206a, second portions 206b, 206b, and a third portion 206c. The side outer electrode body 206a is electrically connected to a second extending portion 234 of a second conductor layer 222, which will be discussed later. The second portions 206b, 206b extend from both ends of the side outer electrode body 206a. The third portion 206c extends from one side (toward the third surface 202c) of the side outer electrode body 206a. Accordingly, the side outer electrode body 206a is located on the first surface 202a, the second portions 206b, 206b are located on the fifth and sixth surfaces 202e and 202f, and the third portion 206c is located on the third surface 202c.

Similarly, the side outer electrode 208 includes an outer electrode body 208a, second portions 208b, 208b, and a third portion 208c. The side outer electrode body 208a is electrically connected to a second extending portion 236 of the second conductor layer 222, which will be discussed later. The second portions 208b, 208b extend from both ends of the side outer electrode body 208a. The third portion 208c extends from the other side (toward the fourth surface 202d) of the side outer electrode body 208a. Accordingly, the side outer electrode body 208a is located on the first surface 202a, the second portions 208b, 208b are located on the fifth and sixth surfaces 202e and 202f, and the third portion 208c is located on the fourth surface 202d.

With the above-described configuration, the first surface 202a defines and serves as a mounting surface of the three-terminal capacitor 200.

Figure 17:
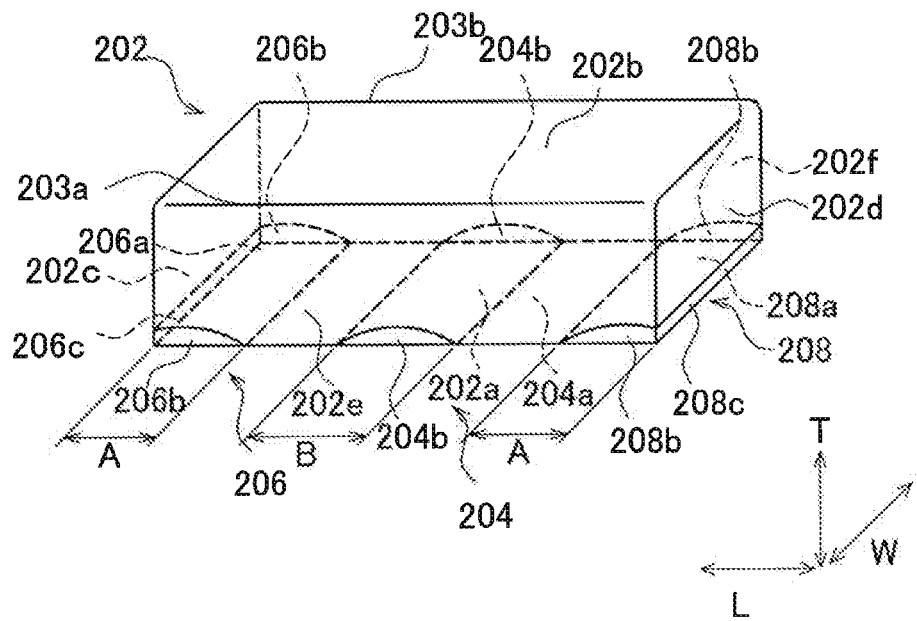
FIG. 17 is an external perspective view of a modified example of the three-terminal capacitor of the second preferred embodiment of the present invention shown in FIG. 14.

In this case, as shown in FIG. 17, a width B of the center outer electrode 204 is preferably greater than a width A of each of the side outer electrodes 206 and 208.

The center outer electrode 204 is preferably defined by applying a paste for forming outer electrodes once, while each of the side outer electrodes 206 and 208 is preferably defined by applying a paste for forming outer electrodes twice, for example. As a result, the thickness of the side outer electrodes 206 and 208 is greater than that of the center outer electrode 204.

A plating film is located on the surface of each of the center outer electrode 204 and the side outer electrodes 206 and 208.

FIG. 17 is an external perspective view of a modified example of the three-terminal capacitor 200 shown in FIG. 14.

Concerning the second surface 202b, which is the top surface of the three-terminal capacitor 200A shown in FIG. 17, the corners of ridge lines 203a and 203b in the length direction L may be polished into rounded portions with an R amount of about 70 µm or smaller, and more preferably, with an R amount of about 30 µm to about 70 µm, for example. The phrase "R amount" indicates a radius of the respective rounded portion.

In this manner, if the R amount of rounded portions of the ridge lines 203a and 203b in the length direction L on the top surface (second surface 202b) of the three-terminal capacitor 200A is about 70 µm or smaller, the area required to suck the three-terminal capacitor 200A to a mount board by using a suction nozzle is reliably secured on the top surface (second surface 202b). As a result, when mounting the three-terminal capacitor 200A on a mount board, it makes it easy for a suction nozzle to suck the top surface (second surface 202b) of the three-terminal capacitor 200A, thus reducing the possibility that a suction nozzle will fail to correctly suck the three-terminal capacitor 200A.

If the R amount of rounded portions of the ridge lines 203a and 203b in the length direction L on the top surface (second surface 202b) of the three-terminal capacitor 200A is about 30 µm or greater, the ridge lines 203a and 203b do not become angular, and are less likely to chip even if a mechanical impact is applied to the ridge lines 203a and 203b.

As shown in FIG. 16, the capacitor element 202 has a multilayer structure including, in the width direction W (stacking direction), a plurality of inner dielectric layers 210, a plurality of first and second conductor layers 220 and 222 which are each disposed at the interface between inner dielectric layers 210, outermost conductor layers 224 and 226 disposed such that they sandwich the plurality of inner dielectric layers 210 therebetween, and outer dielectric layers 212 disposed such that they sandwich the outermost conductor layers 224 and 226 therebetween.

The first conductor layers 220 each have a first opposing portion 228 and a first extending portion 232 extending from the central portion of the first opposing portion 228 downward in the thickness direction T. The first extending portion 232 extends to the central portion of the first surface 202a of the capacitor element 202 so as to be electrically connected to the center outer electrode 204.

The second conductor layers 222 each have a second opposing portion 230, a second extending portion 234 extending from the left end portion of the second opposing portion 230 downward in the thickness direction T, and a second extending portion 236 extending from the right end portion of the second opposing portion 230 downward in the thickness direction T. The second extending portion 234 extends to the left end portion of the first surface 202a of the capacitor element 202 so as to be electrically connected to the side outer electrode 206. The second extending portion 236 extends to the right end portion of the first surface 202a of the capacitor element 202 so as to be electrically connected to the side outer electrode 208.

Figure 18:
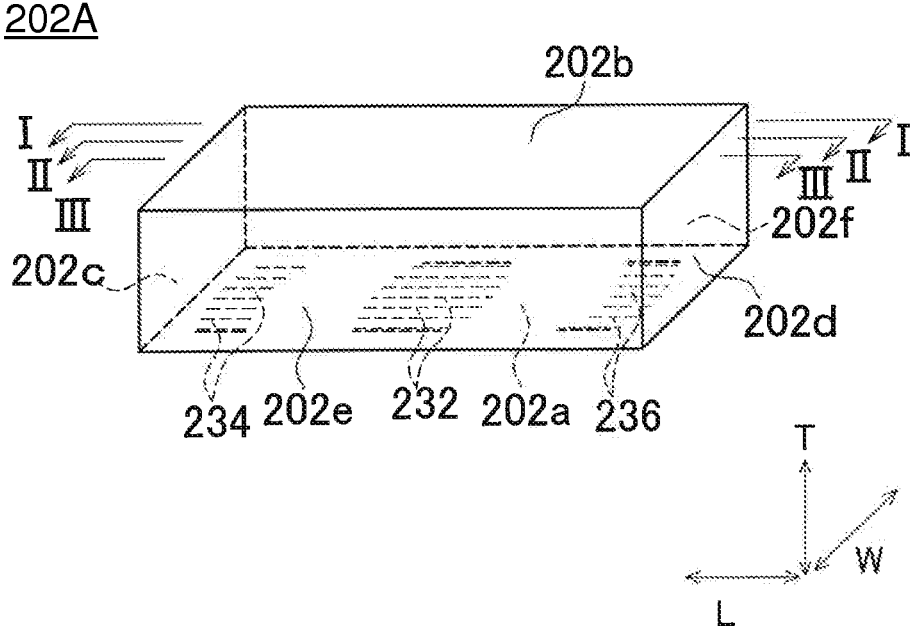
FIG. 18 is a perspective view of a modified example of the capacitor element shown in FIG. 15.
Figure 19:
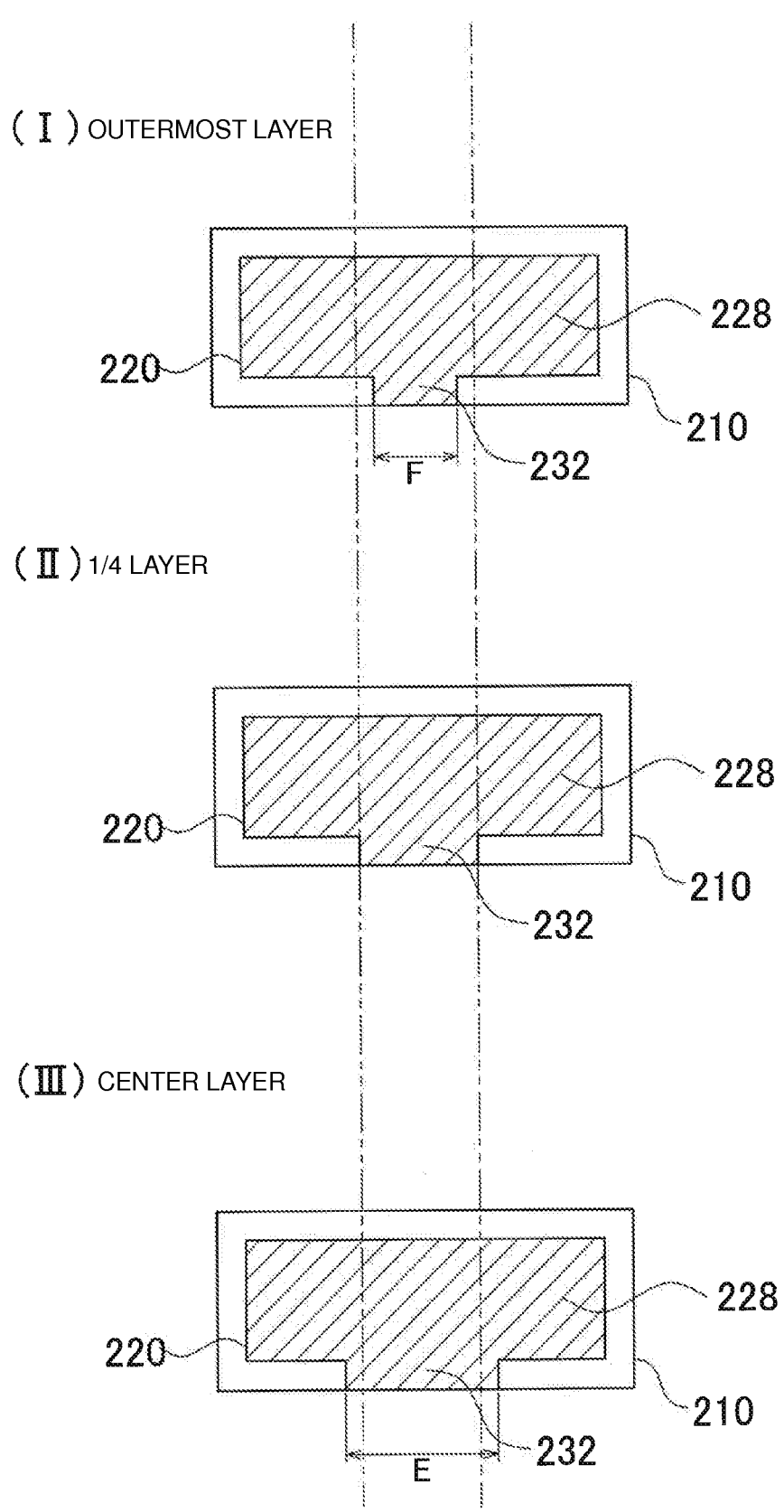
FIG. 19 illustrates a first inner electrode and a first extending portion of the capacitor element shown in FIG. 18.
Figure 20:
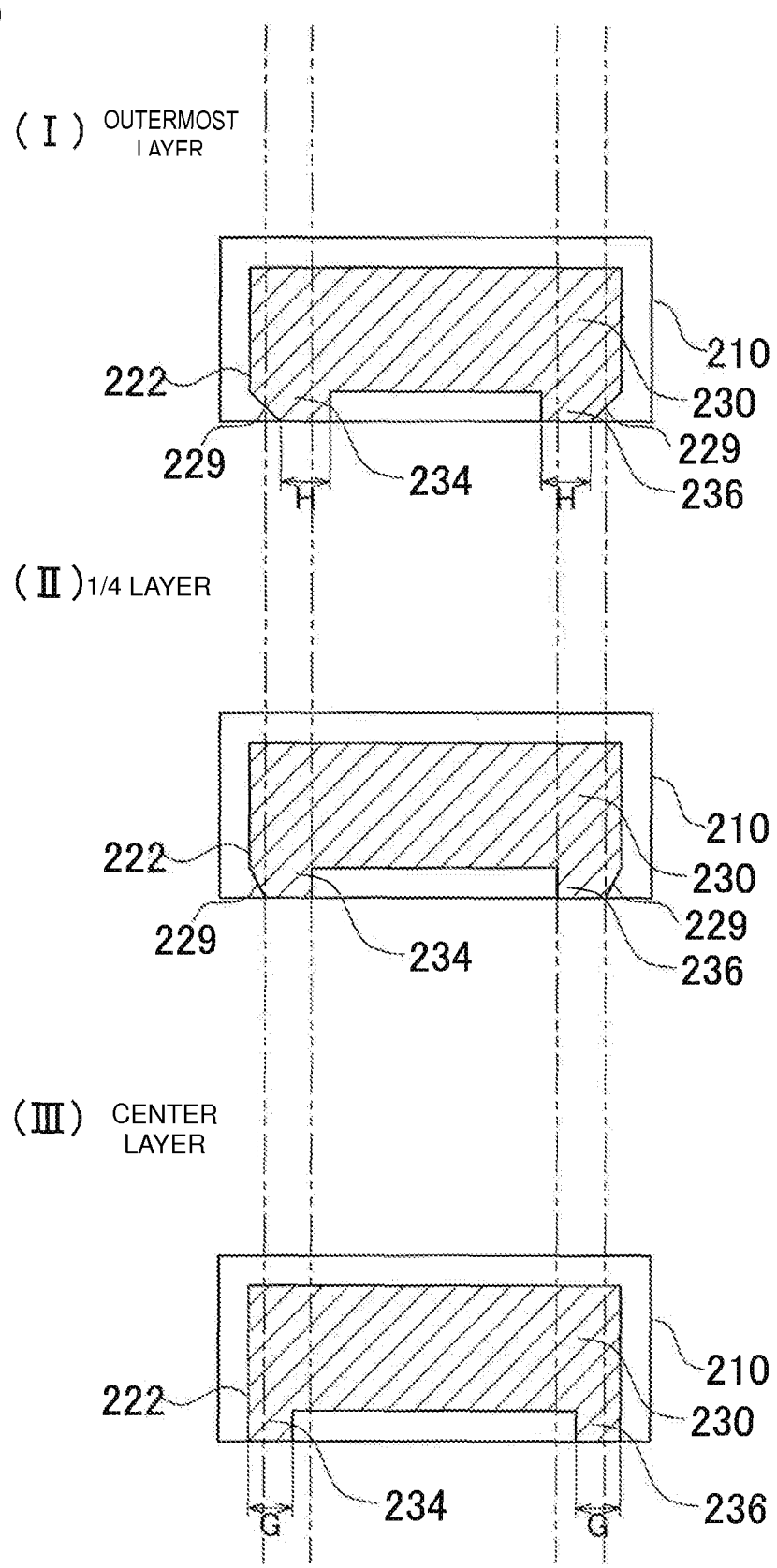
FIG. 20 illustrates a second inner electrode and second extending portions of the capacitor element shown in FIG. 18.

FIG. 18 is a perspective view of a modified example of the capacitor element 202 shown in FIG. 15. FIG. 19 illustrates a first inner electrode (first conductor layer 220) and the first extending portion 232 of the capacitor element 202A shown in FIG. 18. FIG. 20 illustrates a second inner electrode (second conductor layer 222) and the second extending portions 234 and 236 of the capacitor element 202A shown in FIG. 18.

Part (I) of FIG. 19 illustrates the first conductor layer 220 and the first extending portion 232 taken along line I-I (position in the vicinity of the outermost layer of the capacitor element 202A) of FIG. 18. Part (II) of FIG. 19 illustrates the first conductor layer 220 and the first extending portion 232 taken along line II-II (position in the vicinity of a layer disposed farther inward than the outermost layer of the capacitor element 202A by about ¼ of the width W) of FIG. 18. Part (III) of FIG. 19 illustrates the first conductor layer 220 and the first extending portion 232 taken along line III-III (position in the vicinity of a center layer of the capacitor element 202A) of FIG. 18.

A width E of the exposed portion of the first extending portion 232 of the first conductor layer 220 disposed near the center layer of the capacitor element 202A is preferably greater than a width F of the exposed portion of the first extending portion 232 of the first conductor layer 220 disposed near the outermost layer of the capacitor element 202A. The width of the exposed portion of the first extending portion 232 is gradually increased from the position near the outermost layer to the position near the center layer.

Part (I) of FIG. 20 illustrates the second conductor layer 222 and the second extending portions 234 and 236 taken along line I-I of FIG. 18. Part (II) of FIG. 20 illustrates the second conductor layer 222 and the second extending portions 234 and 236 taken along line II-II of FIG. 18. Part (III) of FIG. 20 illustrates the second conductor layer 222 and the second extending portions 234 and 236 taken along line III-III of FIG. 18.

A width G of the exposed portions of the second extending portions 234 and 236 of the second conductor layer 222 disposed near the center layer of the capacitor element 202A is preferably greater than a width H of the exposed portions of the second extending portions 234 and 236 of the second conductor layer 222 disposed near the outermost layer of the capacitor element 202A. The width of the exposed portions of the second extending portions 234 and 236 is gradually increased from the position near the outermost layer to the position near the center layer.

A description will further be given with reference to FIG. 6 used for the first preferred embodiment. The exposed portion of the second extending portion 234 of the second conductor layer 222 disposed near the center layer of the capacitor element 202A is separated from the third surface (end surface) 202c of the capacitor element 202A by a distance C. Similarly, the exposed portion of the second extending portion 236 of the second conductor layer 222 disposed near the center layer of the capacitor element 202A is separated from the fourth surface (end surface) 202d of the capacitor element 202A by a distance C. Meanwhile, the exposed portion of the second extending portion 234 of the second conductor layer 222 disposed near the outermost layer of the capacitor element 202A is separated from the third surface 202c of the capacitor element 202A by a distance D. Similarly, the exposed portion of the second extending portion 236 of the second conductor layer 222 disposed near the outermost layer of the capacitor element 202A is separated from the fourth surface 202d of the capacitor element 202A by a distance D. The distance D is preferably greater than the distance C.

In order to set the distance D to be greater than the distance C, the second extending portions 234 and 236 are configured as follows. As shown in FIG. 20, the second extending portions 234 and 236 of the second conductor layer 222 disposed near the outermost layer of the capacitor element 202A each include an oblique section 229, so that the exposed portions of the second extending portions 234 and 236 are positioned toward the center (inward). Then, by setting the angle of the oblique section 229 to increase from the position of the second conductor layer 222 near the outermost layer to the position of the second conductor layer 222 near the center layer, the positions of the exposed portions of the second extending portions 234 and 236 are shifted gradually toward outward.

Figure 21A:
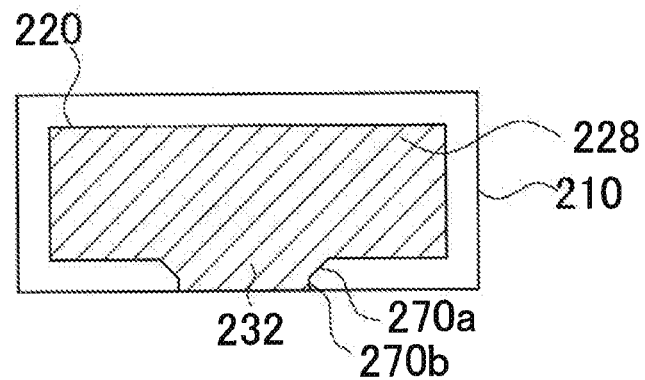
FIGS. 21A and 21B are schematic sectional views of another modified example of the three-terminal capacitor shown in FIG. 14.
Figure 21B:
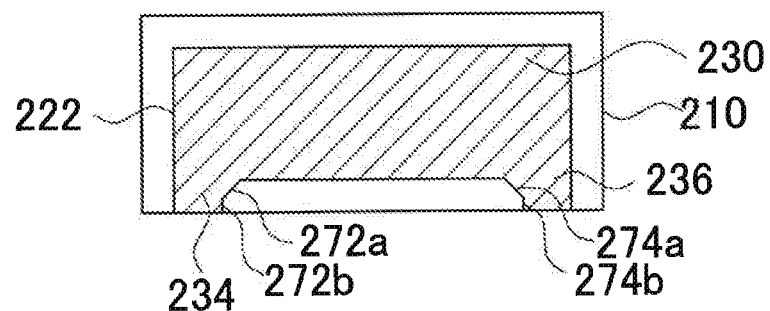

FIGS. 21A and 21B are schematic sectional views of another modified example of the three-terminal capacitor 200 shown in FIG. 14.

As shown in FIG. 21A, the first extending portion 232 may include a double-sided oblique section 270a at a position closer to the first opposing portion 228 and a straight-line section 270b at a position closer to the first surface 202a. The double-sided oblique section 270a extends obliquely in two directions toward the second extending portions 234 and 236.

As shown in FIG. 21B, the second extending portion 234 may include a single-sided oblique section 272a at a position closer to the second opposing portion 230 and a straight-line section 272b at a position closer to the first surface 202a. The single-sided oblique section 272a extends obliquely in one direction toward the first extending portion 232. The second extending portion 236 may include a single-sided oblique section 274a at a position closer to the second opposing portion 230 and a straight-line section 274b at a position closer to the first surface 202a. The single-sided oblique section 274a extends obliquely in one direction toward the first extending portion 232.

The first conductor layer 220 and the second conductor layer 222 oppose each other in the width direction W with the inner dielectric layer 210, which is made of a dielectric material, therebetween. At the portion at which the first and second conductor layers 220 and 222 oppose each other with the inner dielectric layer 210 therebetween (portion at which the first opposing portion 228 of the first conductor layer 220 opposes the second opposing portion 230 of the second conductor layer 222), electrostatic capacitance is generated.

The thickness of each of the outermost conductor layers 224 and 226 is smaller than that of the first or second conductor layer 220 or 222 positioned near the center of the width direction W. The thickness of each of the central portions of the outermost conductor layers 224 and 226 preferably is about 0.8 mm or smaller, for example. For ensuring electrical continuity, the average thickness of each of the outermost conductor layers 224 and 226 preferably is about 0.3 mm or greater, for example.

The coverage of the conductor layers tends to be gradually thinner from the center to both sides in the width direction W. Accordingly, the coverage of the outermost conductor layers 224 and 226 is thinner than that of the first or second conductor layer 220 or 222. The coverage is defined by the ratio of the total length of conductor particles in cross section to the total length of a conductor layer in cross section.

Preferably, the coverage of the outermost conductor layers 224 and 226 is about 0.4 mm to about 0.85 times as large as the coverage of the first or second conductor layer 220 or 222 near the center in the thickness direction T, for example. A pillar 110a that couples the dielectric layers disposed with the outermost conductor layer 224 or 226 therebetween contains at least one of Si, Al, and barium titanate ($BaTiO_3$) segregated from the dielectric layers.

The outermost conductor layer 224 is connected to the center outer electrode 204, as in the first conductor layer 220 disposed adjacent to the outermost conductor layer 224 with the inner dielectric layer 210 therebetween. The outermost conductor layer 226 is connected to the side outer electrodes 206 and 208, as in the second conductor layer 222 disposed adjacent to the outermost conductor layer 226 with the inner dielectric layer 210 therebetween.

As shown in FIG. 12, a boundary layer 227 disposed between the outermost conductor layer 224 or 226 and the outermost dielectric layer 212 includes a Mg—Mn—Ni coexistence region in which Mg and Mn are segregated.

In the three-terminal capacitor 200 configured as described above, the first and second conductor layers 220 and 222 are disposed perpendicularly or substantially perpendicularly to the first surface 202a (in other words, the mounting surface) of the three-terminal capacitor 200, and the stacking direction is parallel or substantially parallel with the first surface 202a (in other words, the mounting surface).

A non-limiting example of a manufacturing method for the above-described three-terminal capacitors 100, 100A, 100B, 200, and 200A will be described below with reference to the flowchart of FIG. 22. In the following description, a non-limiting example of a manufacturing method for the three-terminal capacitor 100 will be discussed mainly.

In step S1, slurry for forming sheets is made by adding an organic binder, a dispersant, and a plasticizer to ceramic powder made of a barium titanate material or a strontium titanate material. Then, the slurry is formed into inner layer and outer layer ceramic green sheets by a doctor blade method.

Then, in step S2, an Ag-containing paste for forming conductor layers is applied onto the inner layer ceramic green sheets by a screen printing method so as to form conductor paste films which will be used as the first and second conductor layers 120 and 122.

Then, in step S3, a plurality of inner layer ceramic green sheets on which conductor paste films are formed are stacked and fixed on each other with pressure such that the conductor paste films forming the first conductor layers 120 and the conductor paste films forming the second conductor layers 122 are alternately disposed. Then, a plurality of outer layer ceramic green sheets are stacked and fixed on each other with pressure so as to sandwich the stacked inner layer ceramic green sheets therebetween. The resulting multilayer ceramic sheets are cut into a size of individual capacitor elements 102, thereby forming a plurality of unfired capacitor elements 102.

In step S3, if necessary, in the state in which the mounting surface (first surface 202a) of the unfired capacitor element 202 is held in a holder, the ridge lines 203a and 203b of the top surface (second surface 202b) in the length direction L are barrel-polished for a predetermined time until the R amount of rounded portions of the ridge lines 203a and 203b will be about 70 μm, for example. Thereafter, the ridge lines 203a and 203b may be further polished by sandblast polishing for a predetermined time until a desired R amount of rounded portion will be obtained.

In this case, for determining the conditions for barrel polishing and sandblast polishing, a sample of the capacitor element 202 is fabricated and the R amount of rounded portions is measured in the following manner by using VHX series digital microscope made by KEYENCE Corporation as a measuring device, for example.

The mounting surface (first surface 202a) of the sample of the capacitor element 202 is molded with a resin, and then, the ridge lines 203a and 203b of the top surface (second surface 202b) in the length direction L are barrel-polished or sandblast-polished for a predetermined time.

Figure 23A:
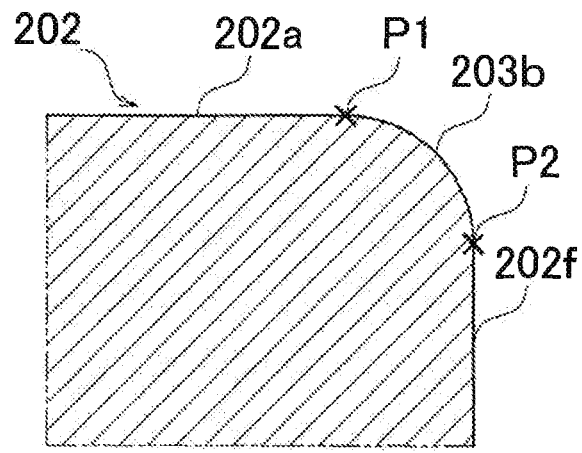
FIGS. 23A and 23B illustrate a method for calculating an R amount of ridge lines.

Then, as shown in FIG. 23A, the polished ridge lines 203a and 203b are observed with a measuring device so as to specify a start point P1 and an end point P2 of a rounded portion. Then, a center point P3 between the start point P1 and the end point P2 is specified.

Figure 23B:
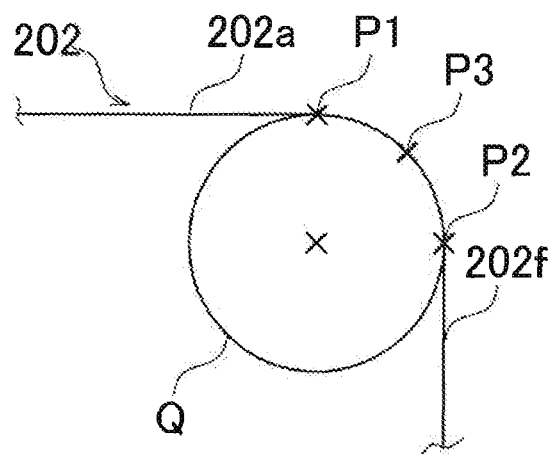

Then, as shown in FIG. 23B, after a circle Q passing the start point P1, the center point P3, and the end point P2 is drawn, the radius of the circle Q is measured so as to calculate the R amount of rounded portion.

Figure 22:
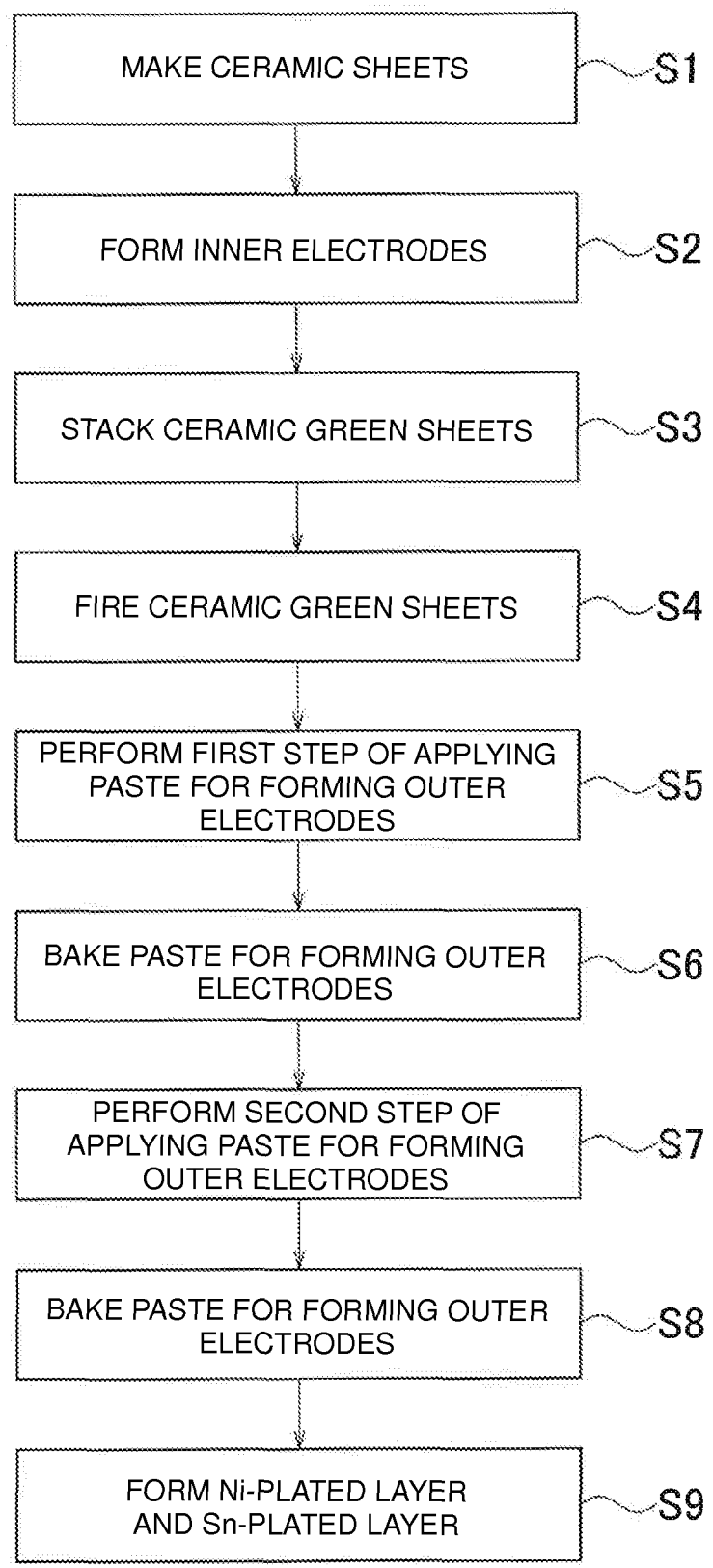
FIG. 22 is a flowchart illustrating an example of a manufacturing method for a three-terminal capacitor according to a preferred embodiment of the present invention.

Referring back to the flowchart of FIG. 22, in step S4, after the unfired capacitor element 102 is subjected to debinding processing, it is fired so as to be formed into a sintered capacitor element 102. The inner layer and outer layer ceramic green sheets and the conductor paste films are fired at the same time. As a result, the inner layer ceramic green sheets are formed into the inner layer dielectric layers 110, while the outer layer ceramic green sheets are formed into the outer layer dielectric layers 112. The conductor paste films are formed into the first and second conductor layers 120 and 122 (first and second inner electrodes).

Then, in step S5, a first step of applying a paste for forming outer electrodes (Ag—Pd alloy paste) to the surface of the sintered capacitor element 102 is performed. In this first step, a paste for forming the center outer electrodes 104 and 105 is applied, and a paste for partially forming the side outer electrodes 106 through 109 is applied.

When applying a paste for partially forming the side outer electrodes 106 through 109 to the surface of the capacitor element 102 in the first step, it is applied such that the center of a paste for forming the side outer electrodes 106 through 109 is separated from the third surface 102c and the fourth surface 102d of the capacitor element 102 toward the inward direction. By applying a paste in this manner, the side outer electrodes 106 through 109 can be formed so as to satisfy H2>H3 and H2'>H3'.

In the first paste-applying step, a paste for forming the center outer electrodes 104 and 105 is applied, and also, a paste for partially forming the side outer electrodes 106 through 109 is applied. In this manner, the side outer electrodes are formed efficiently.

Then, in step S6, the paste applied to the capacitor element 102 to form the center outer electrodes 104 and 105 and the paste applied to the capacitor element 102 to partially form the side outer electrodes 106 through 109 in step S5 are baked. As a result, the center outer electrodes 104 and 105 are formed, and the side outer electrodes 106 through 109 are partially formed. In this case, the thickness of the center outer electrodes 104 and 105 is thicker, while the thickness of the side outer electrodes 106 through 109 is thinner.

Step S6 may be omitted so as to directly shift the process from step S5 to step S7, and the paste for forming the center outer electrodes 104 and 105 and the paste for partially forming the side outer electrodes 106 through 109 may be baked all together in step S8.

Then, in step S7, a second step of applying a paste for forming outer electrodes (Ag—Pd alloy paste) to the surface of the sintered capacitor element 102 is performed. In the second paste-applying step, a paste only for forming the side outer electrodes 106 through 109 is applied.

When applying a paste to the surface of the capacitor element 102 to form the side outer electrodes 106 through 109 in the second step, it is applied such that the center of a paste for the side outer electrodes 106 through 109 is separated from the third surface 102c and the fourth surface 102d of the capacitor element 102 toward the inward direction. By applying a paste in this manner, the side outer electrodes 106 through 109 can be formed so as to preferably satisfy H2>H3 and H2'>H3'.

Then, in step S8, the paste applied to the capacitor element 102 to form the side outer electrodes 106 through 109 in step S7 is baked. As a result, the side outer electrodes 106 through 109 are formed. Then, the thickness of the side outer electrodes 106 through 109 is formed thicker than that of the center outer electrodes 104 and 105.

Then, in step S9, a Ni-plated layer and a Sn-plated layer are sequentially formed by wet plating on the surface of each of the center outer electrodes 104 and 105 and the side outer electrodes 106 through 109. As a result, the three-terminal capacitor 100 (100A, 100B, 200, 200A) is manufactured.

As discussed above, in the three-terminal capacitor 100 of the first preferred embodiment, the center outer electrodes 104 and 105 may be used as signal electrodes, while the side outer electrodes 106 through 109 may be used as ground electrodes, and vice versa.

The value of the insertion loss incurred when the center outer electrodes 104 and 105 are used as signal electrodes and the side outer electrodes 106 through 109 are used as ground electrodes (hereinafter such a pattern will be referred to as a "the first pattern") is indicated by IL1. Conversely, the value of the insertion loss incurred when the center outer electrodes 104 and 105 are used as ground electrodes and the side outer electrodes 106 through 109 are used as signal electrodes (hereinafter such a pattern will be referred to as a "second pattern") is indicated by IL2. In this case, when the three-terminal capacitor 100 is preferably configured to be used in a frequency band of about 10 MHz, the relationship between the insertion loss of the first pattern and that of the second pattern represented by IL1<IL2 is satisfied, and when the three-terminal capacitor 100 is preferably configured to be used in a frequency band of about 100 MHz, the relationship between the insertion loss of the first pattern and that of the second pattern represented by IL1>IL2 is satisfied. That is, in the 100 MHz band, the value of the insertion loss is smaller when the three-terminal capacitor 100 is used with the second pattern than that when the three-terminal capacitor 100 is used with the first pattern.

The reason why the frequency characteristics concerning the insertion loss when the three-terminal capacitor 100 is used with the first pattern are different from those when the three-terminal capacitor 100 is used with the second pattern is that the path through which a signal and noise are transmitted is different between the first pattern and the second pattern. This will be discussed below in detail.

Figure 24A:
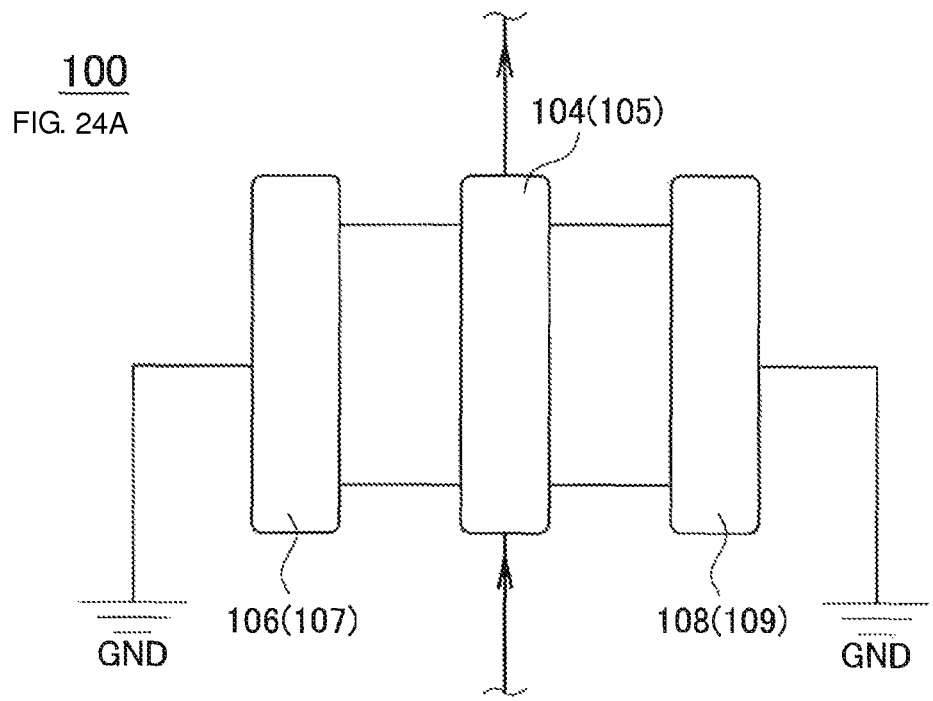
FIGS. 24A through 24C are schematic diagrams illustrating a path through which a signal and noise are transmitted when a three-terminal capacitor of a preferred embodiment of the present invention is used with a first pattern.
Figure 24B:
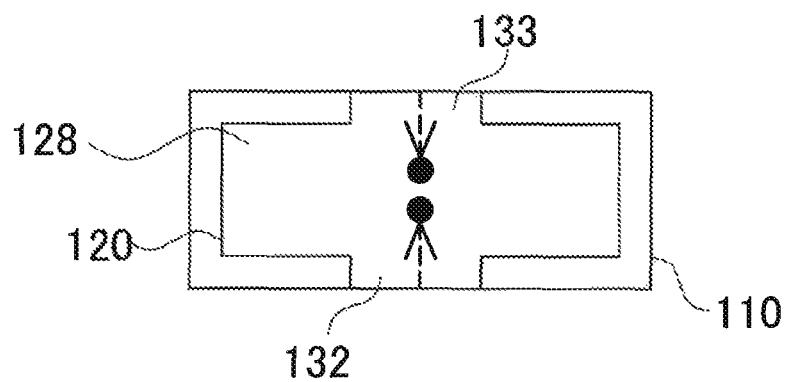
Figure 24C:
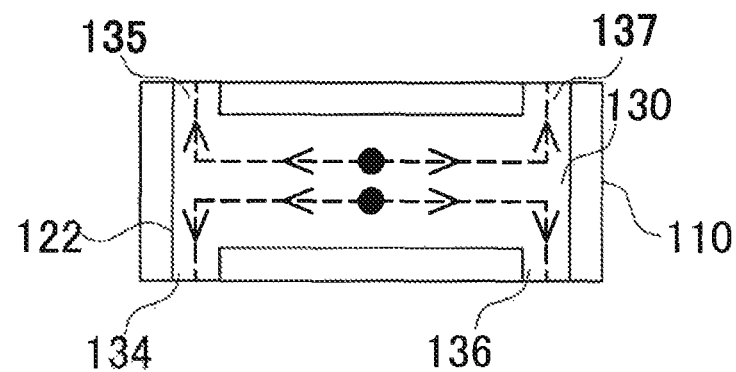

FIGS. 24A through 24C are schematic diagrams illustrating the path through which a signal and noise are transmitted when the three-terminal capacitor 100 is used with a first pattern. FIG. 24A is a schematic diagram of the three-terminal capacitor 100 as viewed from the outside. FIG. 24B is a schematic diagram of the first conductor layer 120. FIG. 24C is a schematic diagram of the second conductor layer 122. In FIGS. 24A through 24C, the solid arrows indicate the flow of a signal, while the dashed arrows indicate the flow of noise.

When the three-terminal capacitor 100 is used with the first pattern, as shown in FIG. 24A, a signal input into the three-terminal capacitor 100 through the center outer electrodes 104 and 105 is transmitted through the center outer electrodes 104 and 105 and is output from the center outer electrodes 104 and 105. Meanwhile, as shown in FIGS. 24B and 24C, noise produced in the first pattern flows to a ground through the second extending portions 134 through 137 of the second conductor layer 122.

Figure 25A:
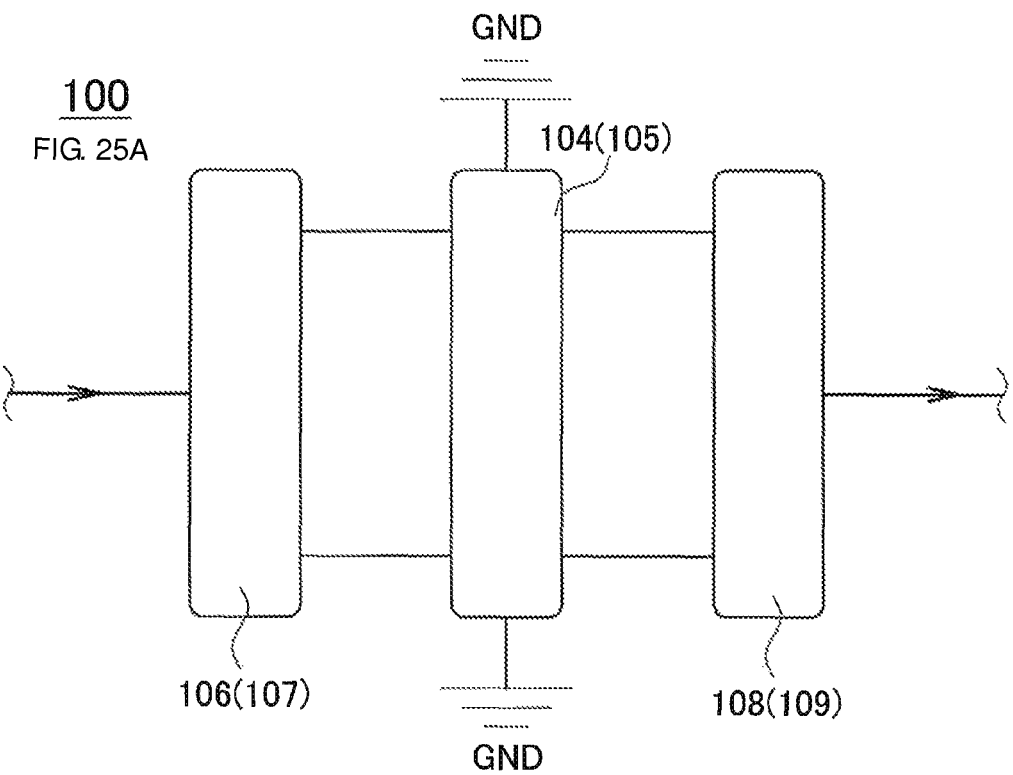
FIGS. 25A through 25C are schematic diagrams illustrating a path through which a signal and noise are transmitted when a three-terminal capacitor of a preferred embodiment of the present invention is used with a second pattern.
Figure 25B:
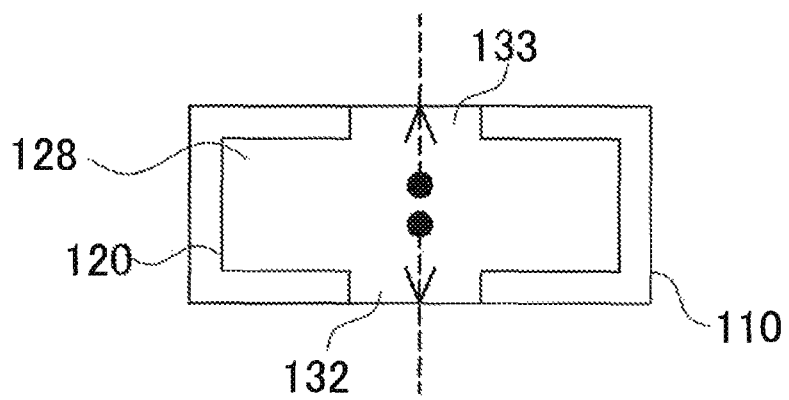
Figure 25C:
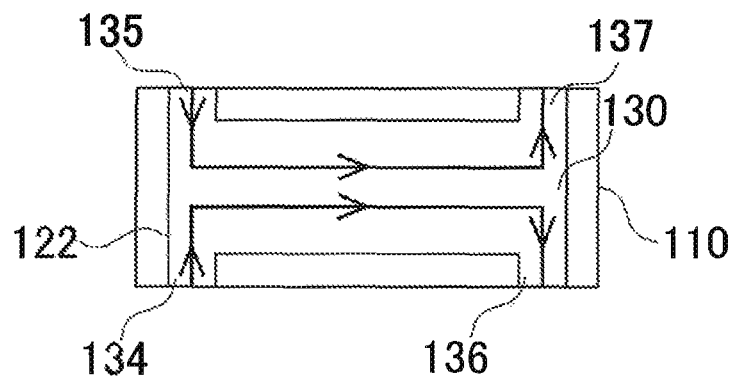

FIGS. 25A through 25C are schematic diagrams illustrating the path through which a signal and noise are transmitted when the three-terminal capacitor 100 is used with a second pattern. FIG. 25A is a schematic diagram of the three-terminal capacitor 100 as viewed from the outside. FIG. 25B is a schematic diagram of the first conductor layer 120. FIG. 25C is a schematic diagram of the second conductor layer 122. In FIGS. 25A through 25C, the solid arrows indicate the flow of a signal, while the dashed arrows indicate the flow of noise.

When the three-terminal capacitor 100 is used with the second pattern, as shown in FIGS. 25A and 25C, a signal input into the three-terminal capacitor 100 through the side outer electrodes 106 and 107 at one side is output from the side outer electrodes 108 and 109 at the other side through the second extending portions 134 through 137 of the second conductor layer 122. Meanwhile, as shown in FIG. 25B, noise produced in the second pattern flows to a ground through the first extending portions 132 and 133 of the first conductor layer 120.

As a result of conducting an extensive study, the present inventors have discovered and conceived that, by considering the fact that the frequency characteristics concerning the insertion loss when the three-terminal capacitor 100 is used with the first pattern are different from those when the three-terminal capacitor 100 is used with the second pattern, the first pattern or the second pattern may be selected depending on a required frequency band. Thus, the present inventors have conducted an experiment for checking that a desirable value of insertion loss may be obtained by using the single signal three-terminal capacitor 100 by changing the pattern to be used, that is, the first pattern or the second pattern, depending on a required frequency band. A description will be given below of an experiment for examining the frequency characteristics concerning the insertion loss when the three-terminal capacitor 100 is used with the first pattern and those when the three-terminal capacitor 100 is used with the second pattern.

Figure 26:
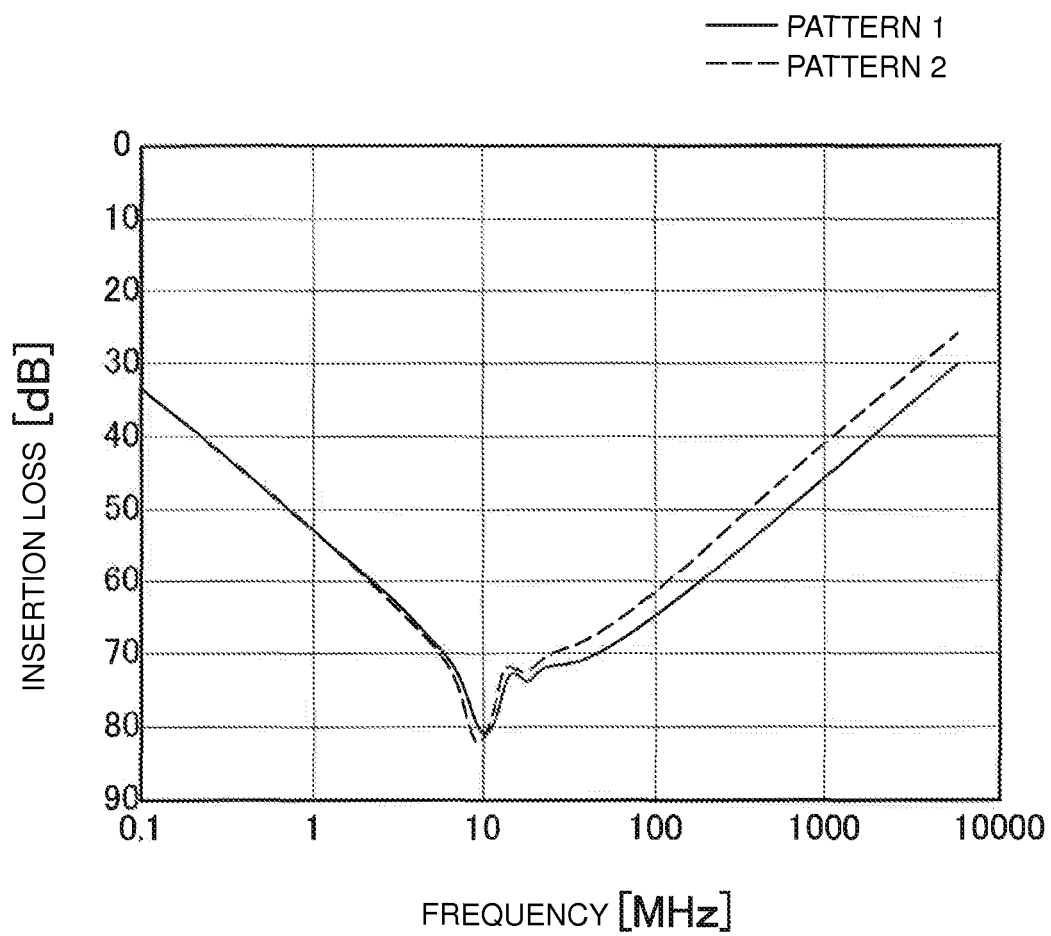
FIG. 26 is a graph illustrating frequency characteristics concerning the insertion loss when a three-terminal capacitor of a preferred embodiment is used with the first pattern and those when a three-terminal capacitor of a preferred embodiment is used with the second pattern.

FIG. 26 is a graph illustrating the result of this experiment. The horizontal axis indicates the frequency (MHz) and the vertical axis indicates the insertion loss (dB). The first pattern is indicated by the solid line, while the second pattern is indicated by the broken line.

The graph of FIG. 26 shows that the first pattern exhibits lower insertion loss than the second pattern when the frequency is around 10 MHz. Accordingly, if a required frequency is about 10 MHz, it is preferable that the three-terminal capacitor 100 is used with the first pattern (that is, the center outer electrodes 104 and 105 are used as signal electrodes and the side outer electrodes 106 through 109 are used as ground electrodes, as shown in FIG. 24A).

On the other hand, the graph of FIG. 26 shows that the second pattern exhibits lower insertion loss than the first pattern when the frequency is around 100 MHz. Accordingly, if a required frequency is about 100 MHz, it is preferable that the three-terminal capacitor 100 is used with the second pattern (that is, the center outer electrodes 104 and 105 are used as ground electrodes and the side outer electrodes 106 through 109 are used as signal electrodes, as shown in FIG. 25A).

That is, by changing the pattern to be used, that is, the first pattern or the second pattern, depending on the required frequency band, a desirable value of insertion loss is obtained by using the single three-terminal capacitor 100.

Although an explanation is not given here, advantages similar to those obtained for the three-terminal capacitor 100 of the first preferred embodiment are achieved for the three-terminal capacitor 200 of the second preferred embodiment, and the other three-terminal capacitors 100A, 100B, 200A of various preferred embodiments of the present invention.

The three-terminal capacitor 100 (200) preferably satisfies the following conditions. The total dimension of E1+ME1+E2+ME2+E3 is greater than the dimension of the capacitor element in the length direction L. The side outer electrode 106 (206) includes the third portion 106c (206c) on the third surface 102c (202c), while the side outer electrode 108 (208) includes the third portion 108c (208c) on the fourth surface 102d (202d). The three-terminal capacitor 100 (100A, 100B, 200, 200A) preferably satisfies |ME1−ME2|<about 50 μm, and also preferably satisfies M2L<M2R, and M1R>M1L, or M2L>M2R and M1R<M1L. With this configuration, the center outer electrode 104 (204) and the side outer electrodes 106 (206) and 108 (208) are always displaced toward determined end surfaces. As a result, the insulation resistance between outer electrodes is less likely to be decreased.

dimensions E1, E2, E3, ME1, ME2, M1R, M2L, M2R, and M3L of the three-terminal capacitors.

The insulation resistance between the center outer electrode and the side outer electrodes of the preferred embodiment and that of the comparative example were measured, and when the insulation resistance was lower than $10^7 \Omega$, it was determined that a decrease in the insulation resistance was observed.

A humidity load test was also conducted on the three-terminal capacitor of the present preferred embodiment and that of the comparative example in the following manner. The three-terminal capacitors were left in an atmosphere of a relative humidity of 100% RH at a temperature of 120° C. for 400 hours while a voltage of 6.3 V was being applied. Then, the insulation resistance IR was measured, and when the insulation resistance IR preferably satisfies Log(IR)<5, it was determined that the three-terminal capacitor was broken.

The evaluation of the insulation resistance characteristics is shown in Table 2, and the evaluation of the humidity resistance characteristics is shown in Table 3.

TABLE 2

| | L dimension (μm) | E1 (μm) | E2 (μm) | E3 (μm) | M1L (μm) | M1R (μm) | ME1 (μm) | M2L (μm) | M2R (μm) | ME2 (μm) | M3L (μm) | M3R (μm) | |ME1−ME2| (μm) | E1+ME1+E2+ME2+E3 | Insulation resistance characteristics |
|---|---|---|---|---|---|---|---|---|---|---|---|---|---|---|---|
| Preferred embodiment | 2005 | 462.21 | 672.81 | 471.8 | 57.2 | 79.4 | 242 | 30.5 | 60.5 | 250 | 35.2 | 115.3 | 8 | 2098.62 | ○ |
| Comparative example | 2097 | 442.4 | 685.4 | 457.2 | 85.2 | 55.5 | 210 | 62.5 | 28.5 | 272 | 32.5 | 95.1 | 62 | 2067 | × |

TABLE 3

| | L dimension (μm) | M1R (μm) | M2L (μm) | M2R (μm) | M3L (μm) | M1R/L | M2R/L | M2L/L | M3L/L | Humidity resistance characteristics |
|---|---|---|---|---|---|---|---|---|---|---|
| Preferred embodiment | 2005 | 57.2 | 30.5 | 60.5 | 35.2 | 2.85% | 1.52% | 3.02% | 1.76% | ○ |
| Comparative example | 2017 | 15.8 | 72.3 | 20.5 | 60.5 | 0.78% | 3.58% | 1.02% | 3.00% | × |

In this three-terminal capacitor 100 (100A, 100B, 200, 200A), if the ratio of each of M1R, M2L, M2R, and M3L to the dimension of the capacitor element in the length direction L is about 1.5% or higher, for example, it is possible to more reliably cover the first extending portion 132 (232) and the second extending portions 134 (234) and 136 (236) by the center outer electrode 104 (204) and the side outer electrodes 106 (206) and 108 (208), respectively. As a result, the insulation resistance between outer electrodes is even less likely to be decreased.

In an experiment, samples of three-terminal capacitors were fabricated in the following manner.

In this experiment, a sample of a three-terminal capacitor of a preferred embodiment of the present invention and a sample of a three-terminal capacitor of a comparative example for evaluating three-terminal capacitors were fabricated by using the above-described manufacturing method on the basis of the conditions indicated in Table 2 and Table 3. The three-terminal capacitor of the present preferred embodiment and that of the comparative example have the same structure in terms of the design, except for the length L and the The results of Table 2 show that the comparative example does not satisfy the relationships E1+ME1+E2+ME2+E3>L, |ME1−ME2|<50 μm, and M2L<M2R and M1R>M1L, or M2L>M2R and M1R<M1L. That is, the distance between the center outer electrode and the side outer electrodes is small, thus decreasing the insulation resistance therebetween.

The results of Table 3 show that, in the comparative example, M1R/L is about 0.78% and M2L/L is about 1.02%, while, in the preferred embodiment, M1R/L, M2R/L, M2L/L, and M3L/L are all about 1.5% or higher so as to obtain good humidity resistance characteristics. Concerning the evaluations of the insulation resistance characteristics, the same results indicated in Table 2 were obtained.

The present invention is not restricted to the above-described preferred embodiments, and may be modified in various manners within the scope and spirit of the present invention.

In the three-terminal capacitor 100 (100A, 100B, 200, 200A) of the first (second) preferred embodiment, concerning the side outer electrode 106 (206) disposed at one end portion of the first surface 102a (202a) in the length direction L, if the higher one of the heights of the longitudinal central portions of the second portions 106b, 106b (206b, 206b) disposed on the fifth and sixth surfaces 102e (202e) and 102f (202f) is indicated by H2 and if the height of the widthwise central portion of the third portion 106c (206c) disposed on the third surface 102c (202c) is indicated by H3, the relationship between the heights H2 and H3 preferably satisfies H2>H3. However, this is only an example.

Concerning the side outer electrode 108 (208) disposed at the other end portion of the first surface 102a (202a) in the length direction L, if the higher one of the heights of the longitudinal central portions of the second portions 108b, 108b (208b, 208b) disposed on the fifth and sixth surfaces 102e (202e) and 102f (202f) is indicated by H2' and if the height of the widthwise central portion of the third portion 108c (208c) disposed on the fourth surface 102d is indicated by H3', the relationship between the heights H2' and H3' preferably satisfies H2'>H3'. However, this is only an example.

In the three-terminal capacitor 100 (100A, 100B, 200, 200A) of the first (second) preferred embodiment, the thickness of the outermost conductor layers 124 and 126 (224 and 226) is smaller than that of the first and second conductor layers 120 and 122 (220 and 222) positioned near the center of the W direction. However, this is only an example.

In the three-terminal capacitor 100 (100A, 100B, 200, 200A) of the first (second) preferred embodiment, the outermost conductor layer 124 (224) is connected to the center outer electrodes 104 and 105 (204), as in the first conductor layer 120 (220) disposed adjacent to the outermost conductor layer 124 (224) with the inner dielectric layer 110 (210) therebetween. However, this is only an example, and the outermost conductor layer 124 (224) may be connected to the side outer electrodes 106 through 109 (206 and 208). Similarly, the outermost conductor layer 126 (226) is connected to the side outer electrodes 106 through 109 (206 and 208), as in the second conductor layer 122 (222) disposed adjacent to the outermost conductor layer 126 (226) with the inner dielectric layer 110 (210) therebetween. However, this is only an example, and the outermost conductor layer 126 (226) may be connected to the center outer electrodes 104 and 105 (204).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-terminal capacitor comprising:
   a capacitor element including first and second surfaces extending in a length direction and in a width direction, third and fourth surfaces extending in the width direction and in a thickness direction, and fifth and sixth surfaces extending in the length direction and in the thickness direction;
   a first-side outer electrode that is disposed at a first end portion of the first surface in the length direction and on predetermined areas of the third, fifth, and sixth surfaces;
   a second-side outer electrode that is disposed at a second end portion of the first surface in the length direction and on portions of the fourth, fifth, and sixth surfaces;
   a center outer electrode that is disposed at a portion of the first surface between the first-side outer electrode and the second-side outer electrode in the length direction and on portions of the fifth and sixth surfaces;
   a plurality of first conductor layers that are disposed within the capacitor element and that are electrically connected to the center outer electrode via a first extending portion; and
   a plurality of second conductor layers that are disposed within the capacitor element and that are electrically connected to the first-side outer electrode via a first-side second extending portion and to the second-side outer electrode via a second-side second extending portion; wherein
   a length of the first-side outer electrode in the length direction is E1;
   a length of the second-side outer electrode in the length direction is E3;
   a length of the center outer electrode in the length direction is E2;
   a width from an edge of the first-side second extending portion closer to the third surface to the third surface is M1L;
   a width from an edge of the first-side second extending portion closer to the fourth surface to an edge of the first-side outer electrode on the first surface is M1R;
   a width from an edge of the first extending portion closer to the third surface to an edge of the center outer electrode on the first surface closer to the third surface is M2L;
   a width from an edge of the first extending portion closer to the fourth surface to an edge of the center outer electrode on the first surface closer to the fourth surface is M2R;
   a width from an edge of the second-side second extending portion closer to the fourth surface to the fourth surface is M3R;
   a width from an edge of the second-side second extending portion closer to the third surface to an edge of the second-side outer electrode on the first surface is M3L; and
   E1<E2, E3<E2, M2L<M2R, M1L<M1R, and M3L<M3R are satisfied.

* * * * *